US012654329B2

(12) United States Patent
Harnett et al.

(10) Patent No.: US 12,654,329 B2
(45) Date of Patent: Jun. 16, 2026

(54) OPTOELECTRONIC SOFT TACTILE SENSOR FOR A STICK-SLIP CONTROL

(71) Applicant: University of Louisville Research Foundation, Inc., Louisville, KY (US)

(72) Inventors: Cindy Harnett, Louisville, KY (US); Michael Seokyoung Han, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 125 days.

(21) Appl. No.: 18/220,443

(22) Filed: Jul. 11, 2023

(65) Prior Publication Data

US 2024/0009850 A1     Jan. 11, 2024

Related U.S. Application Data

(60) Provisional application No. 63/368,078, filed on Jul. 11, 2022.

(51) Int. Cl.
B25J 9/16 (2006.01)

(52) U.S. Cl.
CPC ............. B25J 9/1694 (2013.01); B25J 9/161 (2013.01); B25J 9/1612 (2013.01)

(58) Field of Classification Search
CPC ..................................................... B25J 9/1694
See application file for complete search history.

(56) References Cited

FOREIGN PATENT DOCUMENTS

GB      2574861 A   * 12/2019   ........... G05B 13/042

OTHER PUBLICATIONS

Al-Mohammed et al. (2018) "An Adaptive Control Based Approach for Gripping Novel Objects with Minimal Grasping Force" In 2018 IEEE 14th International Conference on Control and Automation (ICCA), pp. 1040-1045.
Atalay et al. (2017) "Batch Fabrication of Customizable Silicone-Textile Composite Capacitive Strain Sensors for Human Motion Tracking" Adv. Mater. Technol., vol. 2, No. 9, Article 1700136 (8 pages).
Bai et al. (2020) "Stretchable distributed fiber-optic sensors" Science, vol. 370, pp. 848-852.
(Continued)

*Primary Examiner* — Walter L Lindsay, Jr.
*Assistant Examiner* — Andrew V Do
(74) *Attorney, Agent, or Firm* — ALGM LLP; Harry J. Guttman

(57) ABSTRACT
An opto-electronic sensor includes a deformable body that has a gripping surface, securable to and movable by a gripper to a position at which the gripper surface contacts an object, and includes optical waveguides positioned within the deformable body, each optical waveguide including a gap. The deformable body is configured to exhibit a lateral deflection responsive to receiving via the gripping surface a lateral force from the object. The deformable body and the one or more optical waveguides are mutually configured to produce a corresponding change in the gap of the one or more optical waveguides responsive to the lateral deflection. The change in the gap is detectable as a change in a light intensity, by a light source and a light detector. The lateral force is computed using the detected change.

15 Claims, 16 Drawing Sheets
(14 of 16 Drawing Sheet(s) Filed in Color)

(56)          References Cited

OTHER PUBLICATIONS

Boutry et al. (2018) "A hierarchically patterned, bioinspired e-skin able to detect the direction of applied pressure for robotics" Sci. Robot., vol. 3, Article eaau6914 (9 pages).

Canudas de Wit et al. (1995) "A New Model for Control of Systems with Friction" IEEE Transactions On Automatic Control, vol. 40, No. 3, pp. 419-425.

Cavallo et al. (2014) "Slipping detection and avoidance based on Kalman filter" Mechatronics, vol. 24, No. 5, pp. 489-499.

Chen et al. (2018) "Tactile Sensors for Friction Estimation and Incipient Slip Detection—Toward Dexterous Robotic Manipulation: A Review" IEEE Sensors Journal, vol. 18, No. 22, pp. 9049-9064.

Chun et al. (2021) "An artificial neural tactile sensing system" Nature Electronics, vol. 4, pp. 429-438.

Ding et al. (2019) "An Adaptive Control-Based Approach for 1-Click Gripping of Novel Objects Using a Robotic Manipulator" IEEE Transactions On Control Systems Technology, vol. 27, No. 4, pp. 1805-1812.

Dong et al. (2017) "Improved GelSight Tactile Sensor for Measuring Geometry and Slip" In 2017 IEEE/RSJ International Conference on Intelligent Robots and Systems (IROS), pp. 137-144.

Dubey et al. (2006) "A dynamic tactile sensor on photoelastic effect" Sensors and Actuators A, vol. 128, pp. 217-224.

Guo et al. (2016) "Highly Stretchable, Strain Sensing Hydrogel Optical Fibers" Adv. Mater., vol. 28, No. 46, pp. 10244-10249 (plus 6 pages of Supporting Information).

Guo et al. (2019) "Stretchable and Temperature-Sensitive Polymer Optical Fibers for Wearable Health Monitoring" Adv. Funct. Mater., vol. 29, Article 1902898 (8 pages).

Guo et al. (2019) "Soft and Stretchable Polymeric Optical Waveguide-Based Sensors for Wearable and Biomedical Applications" Sensors, vol. 19, Article 3771 (19 pages).

Harnett et al. (2017) "Stretchable Optical Fibers: Threads for Strain-Sensitive Textiles" Adv. Mater. Technol., vol. 2, Article 1700087 (7 pages).

Ito et al. (2011) "Robust Slippage Degree Estimation Based on Reference Update of Vision-Based Tactile Sensor" IEEE Sensors Journal, vol. 11, No. 9, pp. 2037-2047.

James et al. (2018) "Slip Detection with a Biomimetic Tactile Sensor" IEEE Robotics and Automation Letters, vol. 3, No. 4, 3340-3346.

Jamil et al. (2021) "Proprioceptive Soft Pneumatic Gripper for Extreme Environments Using Hybrid Optical Fibers" IEEE Robotics and Automation Letters, vol. 6, No. 4, pp. 8694-8701.

Jiang et al. (2021) "Finger-Skin-Inspired Flexible Optical Sensor for Force Sensing and Slip Detection in Robotic Grasping" Adv. Mater. Technol., vol. 6, Article 2100285 (10 pages).

Johnson et al. (2009) "Retrographic sensing for the measurement of surface texture and shape" In 2009 IEEE Conference on Computer Vision and Pattern Recognition, pp. 1070-1077.

Kang et al. (2014) "Ultrasensitive mechanical crack-based sensor inspired by the spider sensory system" Nature, vol. 516, pp. 222-226.

Leber et al. (2019) "Stretchable Thermoplastic Elastomer Optical Fibers for Sensing of Extreme Deformations" Adv. Funct. Mater., vol. 29, Article 1802629 (8 pages).

Li et al. (2020) "Physical sensors for skin-inspired electronics" InfoMat., vol. 2, pp. 184-211.

Lin et al. (2020) "Absolute length sensor based on time of flight in stretchable optical fibers" IEEE Sensors Letters, vol. 4, No. 10, Article 5000904 (4 pages).

Lin et al. (2022) "Multitouch Pressure Sensing With Soft Optical Time-of-Flight Sensors" IEEE Transactions On Instrumentation and Measurement, vol. 71, Article 7000708 (8 pages).

Liu et al. (2022) "Centrosymmetric- and Axisymmetric-Patterned Flexible Tactile Sensor for Roughness and Slip Intelligent Recognition" Adv. Intell. Syst., vol. 4, Article 2100072 (10 pages).

Marques et al. (2016) "A survey and comparison of several friction force models for dynamic analysis of multibody mechanical systems" Nonlinear Dyn, vol. 86, pp. 1407-1443.

Marques et al. (2021) "An investigation of a novel LuGre-based friction force model" Mechanism and Machine Theory, vol. 166, Article 104493 (16 pages).

Mclnroe et al. (2018) "Towards a Soft Fingertip with Integrated Sensing and Actuation" In 2018 IEEE/RSJ International Conference on Intelligent Robots and Systems (IROS), pp. 6437-6444.

Oh et al. (2020) "Scalable tactile sensor arrays on flexible substrates with high spatiotemporal resolution enabling slip and grip for closed-loop robotics" Sci. Adv. 2020, vol. 6, Article eabd7795 (14 pages) plus 35 pages of Supplementary Materials.

Ohka et al. (2008) "Optical Three-axis Tactile Sensor for Robotic Fingers" in Sensors: Focus Tactile Force Stress Sensing; InTech: Rijeka, Croatia, pp. 103-122, 2008.

Roberts et al. (2021) "Soft Tactile Sensing Skins for Robotics" Current Robotics Reports, vol. 2, pp. 343-354.

Shahmiri et al. (2020) "A Geometric Technique for Multi-Bend/Shape Sensing" In Proceedings of the 2020 CHI Conference on Human Factors in Computing Systems, CHI '20, paper 142, pp. 1-12, New York, NY, USA, Apr. 2020. Association for Computing Machinery.

Shen et al. (2021) "Cutaneous Ionogel Mechanoreceptors for Soft Machines, Physiological Sensing, and Amputee Prostheses" Adv. Mater., vol. 33, Article 2102069 (12 pages).

Tee et al. (2015) "A skin-inspired organic digital mechanoreceptor" Science, vol. 350, No. 6258, pp. 313-316.

Udofia et al. (2020) "3D printed optics with a soft and stretchable optical material" Additive Manufacturing, vol. 31, Article 100912 (10 pages).

Ward-Cherrier et al. (2018) "The TacTip Family: Soft Optical Tactile Sensors with 3D-Printed Biomimetic Morphologies" Soft Robotics, vol. 5, No. 2, pp. 216-227.

Wu et al. (2020) "A new approach for an ultrasensitive tactile sensor covering an ultrawide pressure range based on the hierarchical pressure-peak effect" Nanoscale Horiz., vol. 5, pp. 541-552.

Xu et al. (2019) "Optical Lace for Synthetic Afferent Neural Networks" Sci Robot., vol. 4, No. 34, Article eaaw6304 (19 pages via PMC).

Zhao et al. (2016) "Optoelectronically innervated soft prosthetic hand via stretchable optical waveguides" Sci. Robot., vol. 1, Article eaai7529 (10 pages).

* cited by examiner

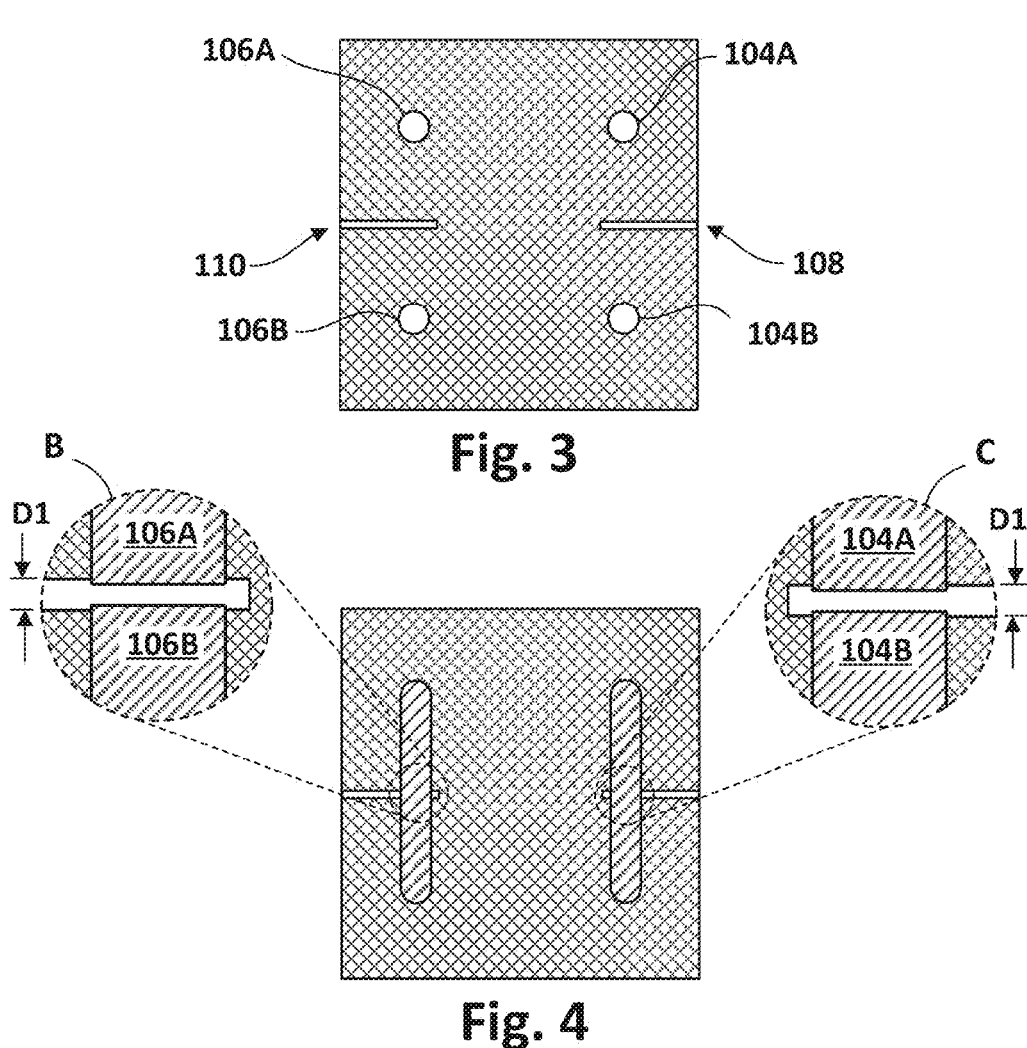
Fig. 3
Fig. 4
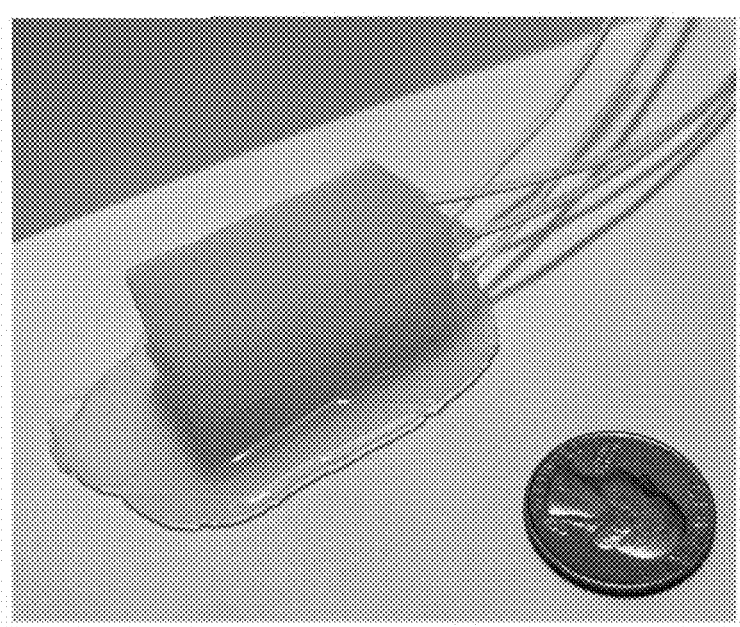
Fig. 5

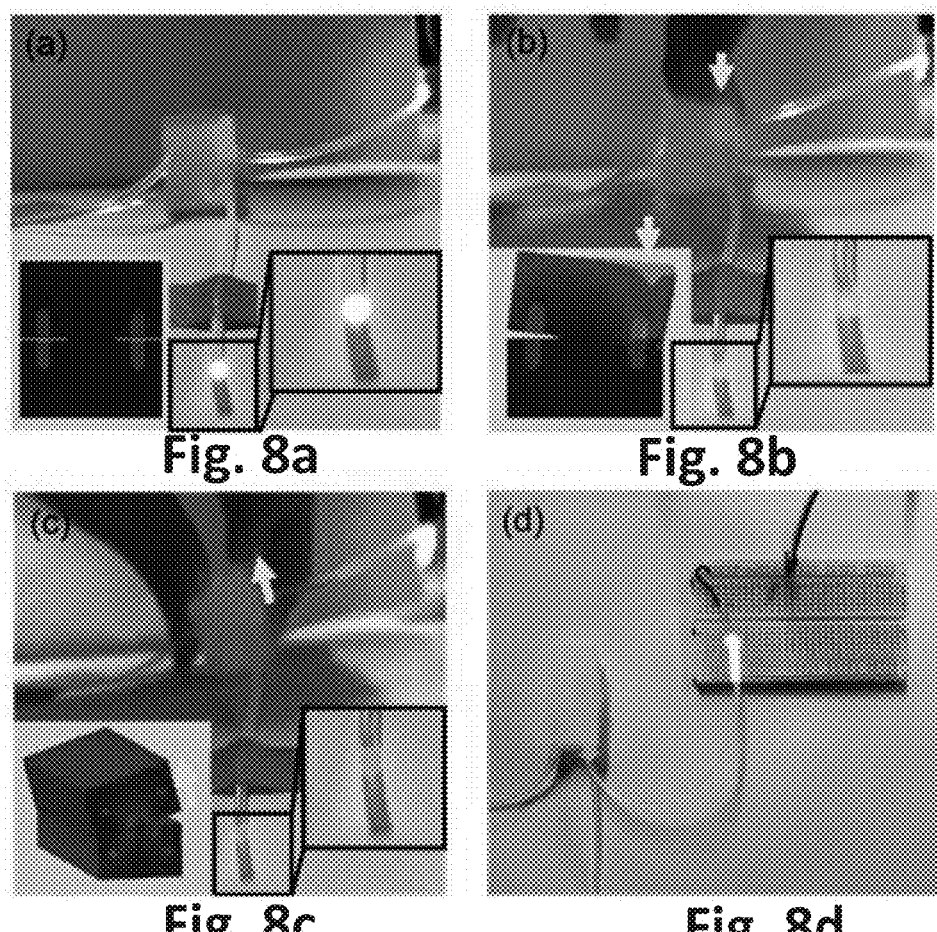
Fig. 8a          Fig. 8b
Fig. 8c          Fig. 8d
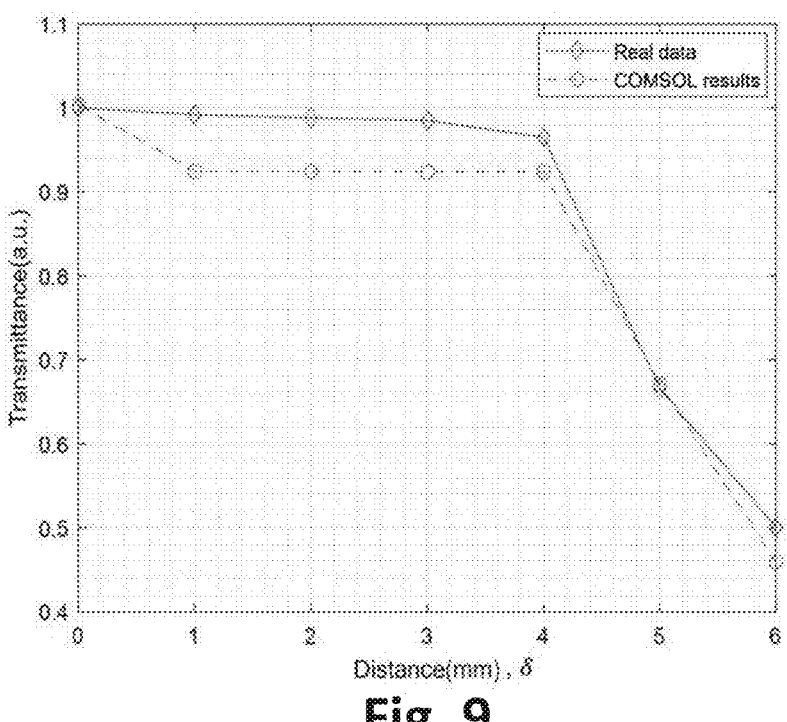
Fig. 9

Fig. 15a
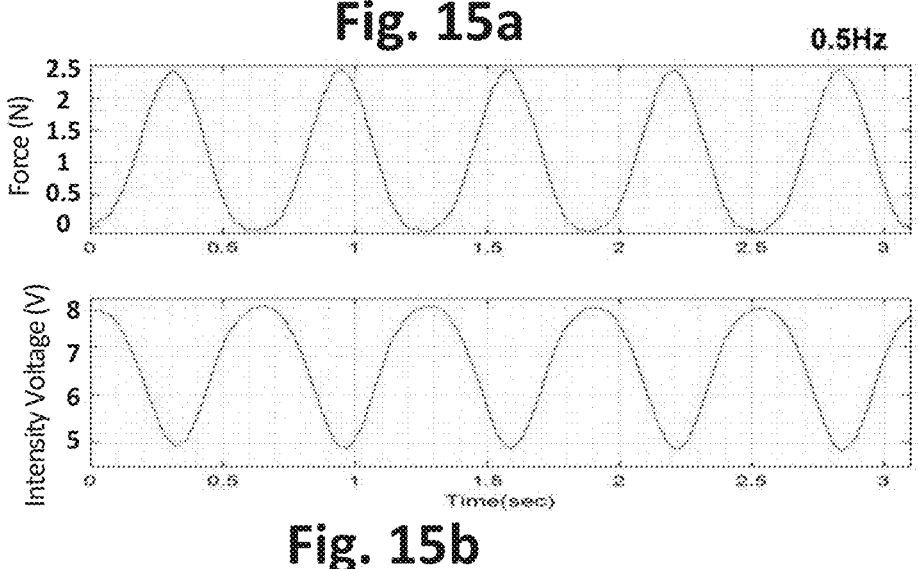
0.5Hz
Fig. 15b
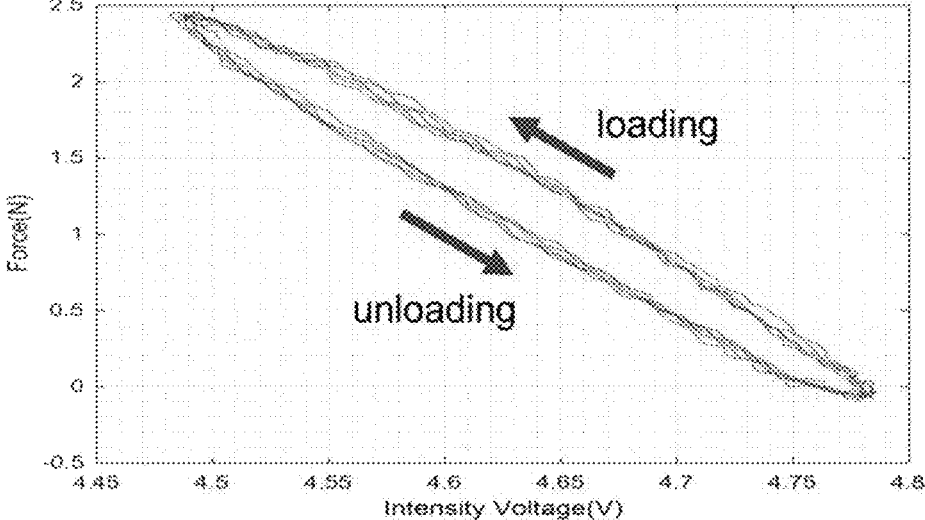
Fig. 16

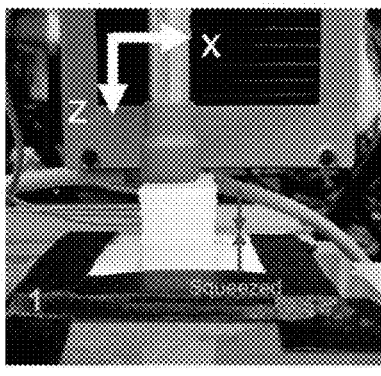
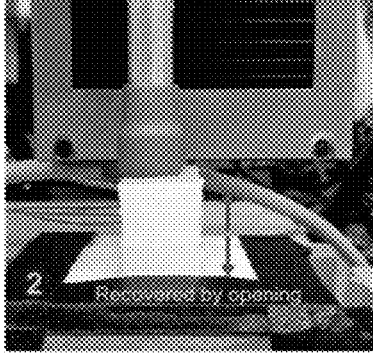
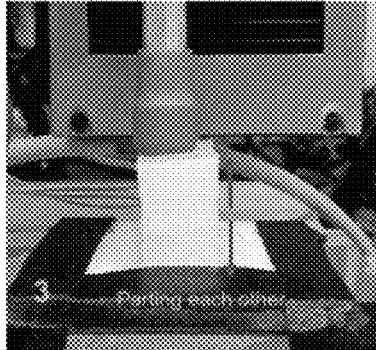
Fig. 19a  Fig. 19b  Fig. 19c
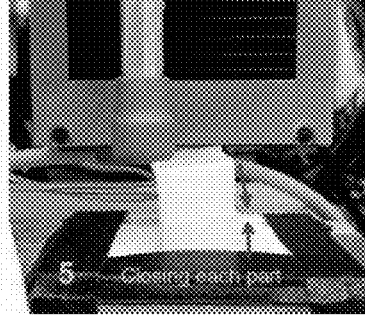
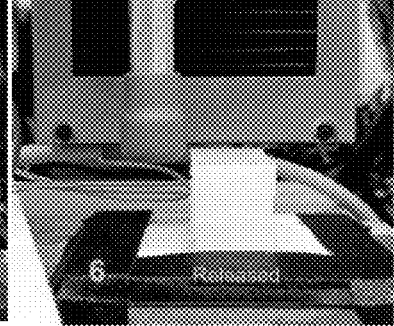
Fig. 19d  Fig. 19e  Fig. 19f
2002
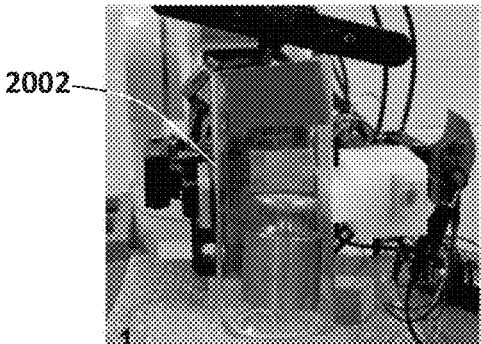
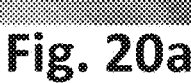
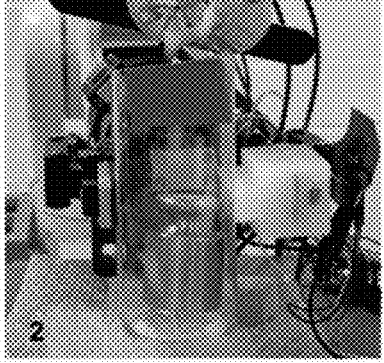
Fig. 20a  Fig. 20b
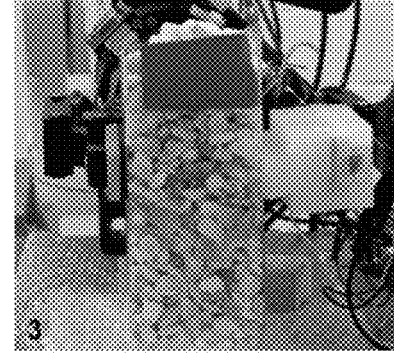
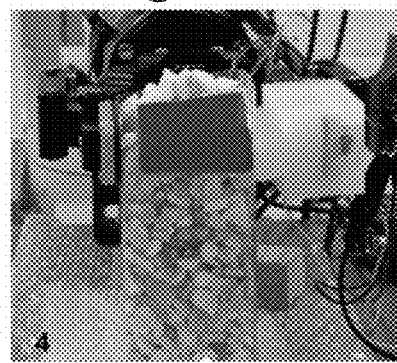
Fig. 20c  Fig. 20d

OPTOELECTRONIC SOFT TACTILE SENSOR FOR A STICK-SLIP CONTROL

CROSS REFERENCE TO RELATED APPLICATIONS

This application claims the benefit under 35 U.S.C. § 119(e) of U.S. Provisional Patent Application No. 63/368,078, filed Jul. 11, 2022, which is hereby incorporated by reference in its entirety.

STATEMENT REGARDING FEDERALLY SPONSORED RESEARCH OR DEVELOPMENT

This invention was made with government support under grant number 1849213 awarded by the National Science Foundation. The government has certain rights in the invention.

TECHNICAL FIELD

This application pertains to tactile sensors for robotic grippers and, more particularly, to optoelectronic tactile sensors for gripper stick-slip control.

BACKGROUND INFORMATION

Robotic devices are used in many applications in which actions include gripping an object, then picking the object up and maneuvering it to a position for an installation of the object or an employing of the object as a tool or instrument to perform a task. Robotic grippers, however, notwithstanding having ever-increasing dexterity, have significant shortcomings compared to the human hand. One is human performing such gripping tasks possesses a range of natural tools which can be difficult to realize in robotics. One is the tactile sensitivity of the human fingertips. Such tactile sensitivity has a characteristic that enables humans to detect, or "feel," in real time a status of the grip of the hand upon the object. The human hand has the further ability not only to detect something is slipping from the hand, but to sense that something is on the verge of slipping. In this description, this will be referenced as "incipient slipping."

SUMMARY OF EXEMPLARY EMBODIMENTS

This Summary identifies example features and aspects and is not an exclusive or exhaustive description of disclosed subject matter. Whether features or aspects are included in or omitted from this Summary is not intended as indicative of relative importance of such features or aspects. Additional features are described explicitly and implicitly, as will be understood by persons of skill in the pertinent arts upon reading the following detailed description and viewing the drawings, which form a part thereof.

One example configuration according to one or more embodiments may include an optoelectronic sensor for stick-slip detection, which may include a deformable body, comprising a gripping surface, which may be configured as securable to and movable by a gripper to a position wherein the gripper surface contacts an object. According to one or more embodiments, there may be one or more optical waveguides positioned within the deformable body. In one or more embodiments, the one or more optical waveguides may each include a gap. The deformable body may be further configured to exhibit a lateral deflection responsive to receiving via the gripping surface a lateral force from the object. In one or more embodiments, the deformable body and the one or more optical waveguides may be mutually configured to produce a corresponding change in the gap of the one or more optical waveguides responsive to the lateral deflection.

According to one or more embodiments, the deformable body, the first internal optical waveguide, and the second internal optical waveguide may be mutually further configured to produce, responsive to a first direction of the lateral deflection, a positive change in a first gap of the first internal optical waveguide and a negative change in a second gap of the second internal optical waveguide.

Methods according to one or more embodiments may provide a gripper control, and may include includes an opto-electronic tactile sensor for stick-slip detection on a gripping surface, to grip an object and to lift the object, and operations may include, concurrent with controlling the robotic gripper, receiving at a computer resource a deflection data from the opto-electronic soft tactile sensor and computing, based on the deflection data, whether an incipient slip condition is present. Operations may also include, in response to a positive result of the computing, controlling the gripper to take a corrective action.

Examples also include an activatable opto-electronic sensor, which may comprise a deformable body, and a first optical waveguide, supported by the deformable body, comprising, within the deformable body, a segment of a first optical fiber. The example may also include a second optical waveguide, supported by the deformable body, comprising, within the deformable body, a segment of a second optical fiber. According to one or more embodiments, the deformable body may be configured with a clearance gap that is configured to provide a clearance for an activating operation. The clearance gap may be configured to provide for an insertion of a cutting blade to a depth sufficient to cut the segment of the first optical fiber by a cut width that establishes a first gap, and to provide for an another insertion of the cutting blade to a depth sufficient to cut the segment of the second optical fiber by a cut width that establishes a second gap.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows an end projection view, from FIG. 1 first end projection plane 3-3, of an arrangement of respective exterior portions of soft optical fiber segments that may be formed via a completion process comprising a cutting of gaps in a first soft optical waveguide and a second soft optical waveguide, forming an optoelectronic soft tactile sensor in accordance with one or more embodiments.

FIG. 4 shows a cross-cut projection view, from FIG. 1 cross-cut end projection plane 4-4, of an arrangement of soft optical fiber segments of the structures of the formed via a completion process comprising a cutting of gaps in a first soft optical waveguide and a second soft optical waveguide, forming an optoelectronic soft tactile sensor in accordance with one or more embodiments.

FIG. 5 shows a captured image of external structure of one physical example of a finger-sized implementation of one configuration of an optoelectronic soft tactile sensor according to one or more embodiments, for stick-slip control and other applications.

FIG. 8a shows a captured image of a no-indicated force state exhibited by a constructed physical prototype of example optoelectronic soft tactile sensor based force detection system according to one or more embodiments, and shows inserted with the captured image a LuGre simulation model representing the no-force applied state.

FIG. 8b shows a captured image of an active detection light state exhibited by the FIG. 8a constructed physical prototype, responsive to manual pressing of the optoelectronic soft tactile sensor.

FIG. 8c shows a captured image of a manual tilting of the optoelectronic soft tactile sensor of the FIG. 8a constructed physical prototype.

FIG. 8d shows a captured image of an active state of a light emitting diode (LED) of the FIG. 8a constructed physical prototype, corresponding to applying a force on the optoelectronic soft tactile sensor.

FIG. 9 shows a two-axis graph format record of test data for LED intensity versus optoelectronic soft tactile sensor deflection magnitude, obtained from the FIG. 8a-8d optoelectronic soft tactile sensor based force detection system from manual deflecting of the system's optoelectronic soft tactile sensor.

FIG. 15a and FIG. 15b shows sensor hysteresis test of the FIG. 12 system with a 0.5 Hz sine wave normal loading.

FIG. 16 shows a sensor hysteresis test with a 0.5 Hz sine wave normal loading. It presents relatively uniform intensity data for the loading and unloading process, with a linear intensity-vs-force relationship in the sub-5 N force range.

FIG. 19a; FIG. 19b; FIG. 19c; FIG. 19d; FIG. 19e; and FIG. 19f show a silicone sensor deformation while slipping. Each number at the right corresponds to the numbers on the intensity voltage data at the left.

FIG. 20a; FIG. 20b; FIG. 20c; and FIG. 20d show stick-slip events 1 through 4, respectively. The initial weight is 300 g. As pebbles are poured into the bottle, the gripper experiences increasing lateral force until slip occurs.

DETAILED TECHNICAL DESCRIPTION

Figures 1, 2A, 2B:
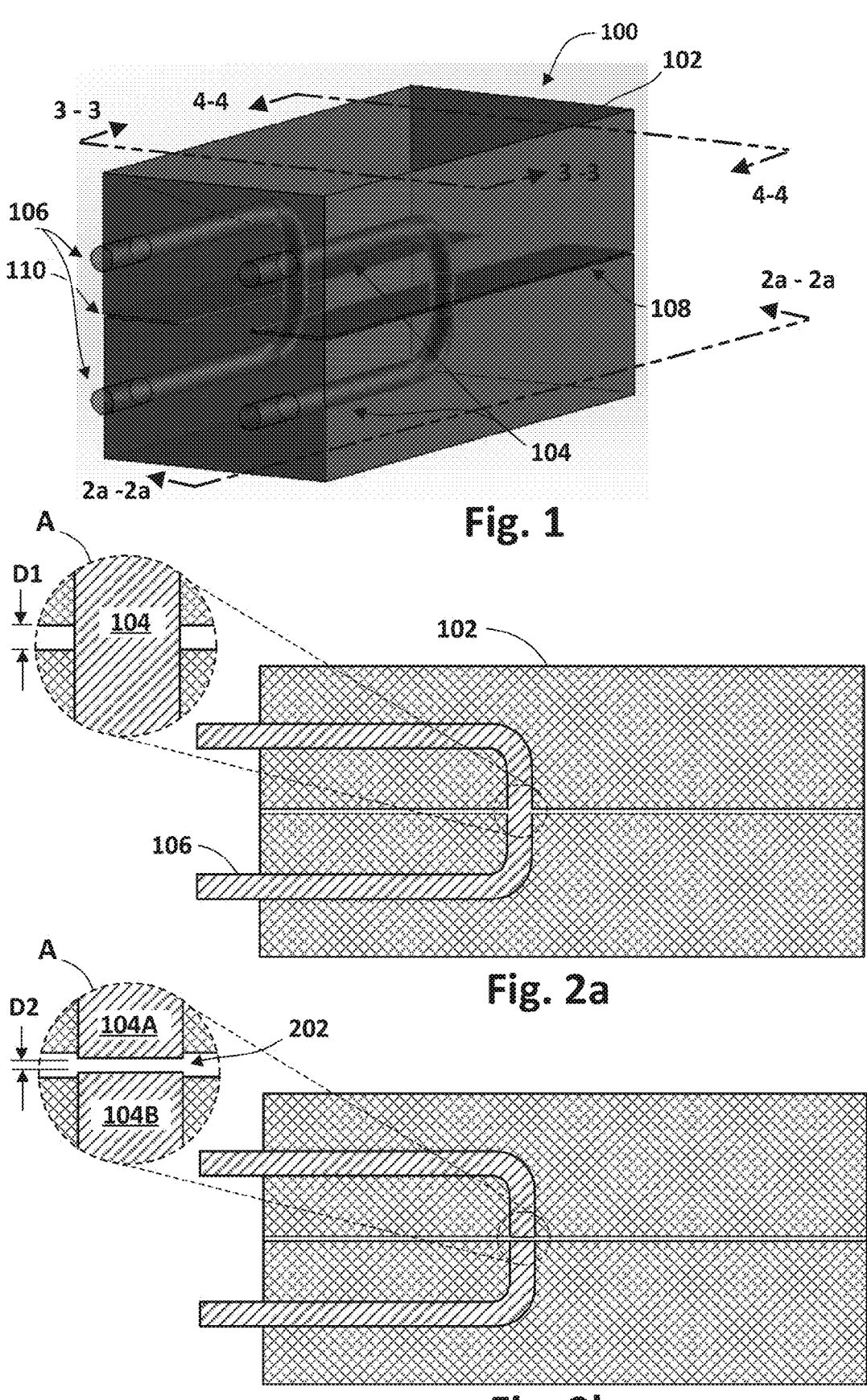
FIG. 1 shows a perspective view of aspects in one example configuration of an in-process structure of an optoelectronic soft tactile sensor according to one or more embodiments, for stick-slip control and other applications.
FIG. 2a shows a front projection view, from FIG. 1 front projection plane 2a-2a, prior to an example cutting of gaps in the FIG. 1 in-process soft optical fiber waveguide structures of the FIG. 1 in-process structure in accordance with one or more embodiments.
FIG. 2b shows a front projection view, from the same FIG. 1 projection plane 2a-2a, of a nominal result of a cutting action as described in reference to FIG. 2a, producing an optoelectronic soft tactile sensor in accordance with one or more embodiments.

According to one or more embodiments, structure of an optoelectronic soft tactile sensor for stick-slip detection and other applications can include a deformable body, comprising a gripping surface that may be configured for being secured to a gripper. As will be understood by persons of ordinary skill in the art upon reading this disclosure, "gripper" as used herein means only a capability of applying net lateral compressive force to an object sufficient to lift and appropriately maneuver and position an object or tool, without limitation as to, for example, a number of or a form of actuatable members or elements, or a number or arrangement of axes of movement. Such persons will understand, upon reading this disclosure, that optoelectronic soft tactile sensors and systems and methods comprising such sensors according to this disclosure are available irrespective of the specific form of the gripper, e.g., without degree and type of articulation. Examples can include, without limitation, an articulated hand, two-finger pincer, parallel jaw gripper, suction cup, jamming gripper, which can be a soft balloon filled with beads or coffee grounds that molds around objects and holds its shape under vacuum, an electromagnetic grabber, a soft robotic gripper, a three-fingered gripper, and/or a gecko-inspired gripper that can utilize a temporary adhesion.

In one or more embodiments, structure of an optoelectronic soft tactile sensor for stick-slip detection and other applications can comprise a deformable body, and supported and arranged within the deformable body in a novel integrated manner may be one or more optical waveguides that, via a cooperative mechanical coupling with the deformable body that, responsive to stick-slip force induced lateral deflection of the deformable body, can cause a corresponding repeatably accurate detectable change in the gap of the one or more optical waveguides.

According to one or more embodiments, the deformable body of the optoelectronic soft tactile sensor can be configured to exhibit, when the gripper is gripping and lifting an object, a lateral deformation responsive to receipt of lateral force, at the gripping surface, transferred to the gripping surface by the object surface sticking to the gripper surface. The deformation can include an elongation of an edge of the deformable body silicone and a squeezing of another edge. According to one or more embodiments, the type of deformation in combination with a structure and constituent material of the deformable body can provide a spring-type mechanism that may effectively amplify and, by a cooperative, repeatable effect on the respective gaps of the one or more optical waveguides, enable accurate real-time detection of the force.

Depending on the direction of deformation, i.e., direction of the friction, one or more of the gaps can open during deformation, making a clearance $\delta$ at the elongating edge. Because the soft optical fiber is opened by the gap while the force is applied, the light intensity is changed. Larger lateral displacements may cause larger openings, increasing $\delta$ and which may cause a corresponding decrease in transmitted light intensity. To detect the gap systems can include, according to one or more embodiments, a light generation resource that may inject a respective light into the one or more optical waveguides and a light detection resource that may detect, for each of the optical waveguides, a magnitude of the injected light that traversed the respective optical path—with its respective gap. Stated differently, a light detection resource may detect for, each optical waveguide supported in the deformable body, the waveguide's transmittivity of light which indicates the width its gap.

According to one or more embodiments, each optical waveguide of the photoelectronic sensor may comprise an optical waveguide first segment and an optical waveguide second segment, which may have respective ends that may be supported within the deformable body so as to face one another, separated by the gap. The respective end of the optical waveguide first segment may form, for example, "a gap first optical face" and the respective end of the optical waveguide second segment may form, for example, "a gap second optical face." Configurations may include, in one or more embodiments, an internal portion or length of the optical waveguide first segment extending within the deformable body from the gap first optical face and exits from a surface of the deformable body. In a similar manner an internal portion or length of the optical waveguide second segment may extend within the deformable body from the gap second optical face, and exit the deformable body. Systems and methods according to one or more embodiments may include one or more light sources and may include one or more light detectors. According to one or more embodiments, the optical waveguide second segment can be, but is not limited to being, similarly configured, i.e., can include a second segment internal portion or section that can extend within the deformable body from the second optical face to another location on the external surface of the deformable body, and a second segment external portion or section that can extend from the other location to, for example, another external connection. The external connection for the first segment external portion can be, for example, one among a light source and a light detector, and the external connection for the second segment external portion can be, for example, the other among the light source and the light detector.

According to one or more embodiments, the optical waveguides can be implemented as optical fibers and, in an aspect, the optical fibers can be soft optical fibers. In accordance with one or more embodiments, the optical fibers can be particularly supported by the deformable body. In one or more embodiments, a structure of the support can compare to human nerve structure and can therefore be referenced herein as "innervated fibers."

According to one or more embodiments the innervated fibers comprise, for each optical waveguide, an optical waveguide soft fiber first segment and an optical waveguide soft optical fiber second segment. The optical waveguide soft fiber first segment can extend within the deformable body from a respective soft fiber first segment first end face, which can form the first optical face, to a location on the external surface of the deformable body, and can continue from that location on the deformable body surface to an external connection. The external connection can be, for example, the above-described connection to a light source or to a light detector. The portion of the optical waveguide soft fiber first segment extending within the deformable body can form, for example, the general example's first segment internal portion. The remainder of the optical waveguide soft fiber first segment, i.e., the portion continuing to the external connection, can implement the general example's first segment external portion. Continuing with description of an optoelectronic sensor according to one or more embodiments comprising soft fiber structured optical waveguides, the optical waveguide soft fiber second segment can extend within the deformable body from a respective soft fiber second segment first end face, which can form the second optical face, to another location on the deformable body and can continue to another external connection. The other external connection can be the other among the light source and light detector. The portion of the optical waveguide soft fiber second segment extending within the deformable body can form, for example, the general example's second segment internal portion, and the portion continuing to the other external connection, can implement the general example's second segment external portion.

Monitoring of slip is not limited to slip due to gravitational pull. The causation of the force that is transferred can be the force of gravity acting on the object, The causation can also be an acceleration force caused, e.g., by the gripper imparting a movement to the object. Another causative force can be an urging force, for example, the gripper pushing or otherwise urging an object into a mechanical engagement.

FIG. 1 shows a perspective view of example aspects in one structural configuration of an in-process optoelectronic soft tactile sensor structure 100 according to one or more embodiments, for stick-slip control and other applications. The structural configuration shown by FIG. 1 is referenced herein as "in process" because the configuration may include not-yet final form optical waveguide structure that according to one or more embodiments may be further processed, as described in more detail in later paragraphs.

The FIG. 1 in-process optoelectronic soft tactile sensor 100 may include a deformable body 102 and, well-supported within the deformable body 102, may be one or more in-process optical waveguide structures. Examples shown in FIG. 1 include, but are not limited to, a first in-process optical waveguide structure 104 and a second in-process optical waveguide structure 106. For purposes of description the FIG. 1 first in-process optical waveguide structure 104 and second in-process optical waveguide structure 106 may be collectively referenced as "in-process optical waveguide structures 104-106."

Regarding the number of "in-process optical waveguide structures 104-106," i.e., integer two, persons of ordinary skill in the pertinent arts will understand upon reading this disclosure that two is not a limitation on the number of, or on the respective geometric distribution of such "in-process optical waveguide structures 104-106," or of completed, activated optical waveguide devices that may be formed, as described in more detail in later sections, by further processing of such structures, in accordance with disclosed embodiments. A single exemplary sensor may have one or more optical fibers, e.g., one, two, three, or more than three optical fibers, depending on the desired application for the sensor.

According to one or more embodiments, soft optical fiber may be an implementation of the in-process optical waveguide structures 104-106, and therefore the optical waveguide devices formed by subsequent process on the structures 104-106. Further, operations in forming these structures can include annealing, as described in more detail in later paragraphs.

According to one or more embodiments, example materials for the deformable body 102 of the in-process optoelectronic soft tactile sensor 100 may include, without limitation, elastomeric polymers, such as silicone. Considerations in material selection may include linearity of deformation versus force, springiness, environmental temperature range, and adhesion to the in-process optical waveguide structures 104-106. According to one or more embodiments the deformable body 102 may be fabricated by, for example and without limitation, various molding processes. Example operations and features of such molding processes are described in more detail in later sections. According to one or more embodiments, though, one of the features comprises a novel forming of a novel configuration of clearance gaps, such as the example first clearance gap 108 and second clearance gap 110, and this molding feature is noted here because it facilitates, with efficiency and with production accuracy, the further processing that can form and activate the soft optoelectronic tactile sensing functionality of the in-process optoelectronic soft tactile sensor 100. The clearance gaps provide, more specifically, both a clearance for and a guide for a cutting blade, or other cutting device, to produce respective gaps in each of the in-process optical waveguide structures 104-106.

Example features and examples of cutting operations are described in reference to FIG. 2a and FIG. 2b. FIG. 2a is a front projection view on FIG. 1 projection plane 2a-2a of the in-process optoelectronic soft tactile sensor 100 as described above. To focus on aspects of cutting the soft optical fibers that for this example may form the in-process optical waveguide structures 104-106, description of cutting operations may alternatively reference said structures as "the first soft optical fiber waveguide 104" and "the second soft optical waveguide 106."

As seen in the FIG. 2a enlarged viewing area A, the first clearance gap 108 may be formed with a clearance gap width D1. It will be understood that "width" as used herein, in the context of gaps and the cutting of such gaps in, for example, soft optical fiber structured optical waveguides, can mean aligned with the longitudinal axis of the optical fiber at the location where the gap is formed.

It will be understood that considerations in choosing the clearance gap width D1 include the width of the gap to be formed in the soft optical fiber. FIG. 2B shows an example of said width as gap width D2. According to one or more embodiments, the cutting may be performed by a cutting blade, by a human or by an automated cutting machine. In the case of a human performing the cutting action, human judgment is not required; the human only aligns the blade with the clearance gap, e.g., the first clearance gap 108. To assist in providing for a cutting movement of the cutting blade, the clearance gap width D1 may be larger than the gap width D2. For illustration purposes, and not as any limitation on practices according to disclosed embodiments, and not to be understood as intended as a statement of preferred values of the clearance gap width D1, or of the gap width D2, or their ratio, an example blade thickness was 0.2 mm.

FIG. 3 shows an end projection view, from FIG. 1 first end projection plane 3-3, of an arrangement of respective exterior portions of the soft optical fibers forming the first soft optical waveguide and forming the second soft optical waveguide of the FIG. 1 structure.

FIG. 4 shows a cross-sectional view from FIG. 1 cross-sectional projection plane 4-4. after the gaps are cut.

The optoelectronic soft tactile sensor 100 shows a symmetric structure, which can provide for a bilateral force detection, meaning can provide for a measuring of normal direction pressure and a measuring of forces that relate to slip motion changes irrespective, to some extent, of direction.

FIG. 5 is a captured image of external structure of one physical example of a finger-sized implementation of one configuration of an optoelectronic soft tactile sensor according to one or more embodiments, for stick-slip control and other applications.

Figure 6:
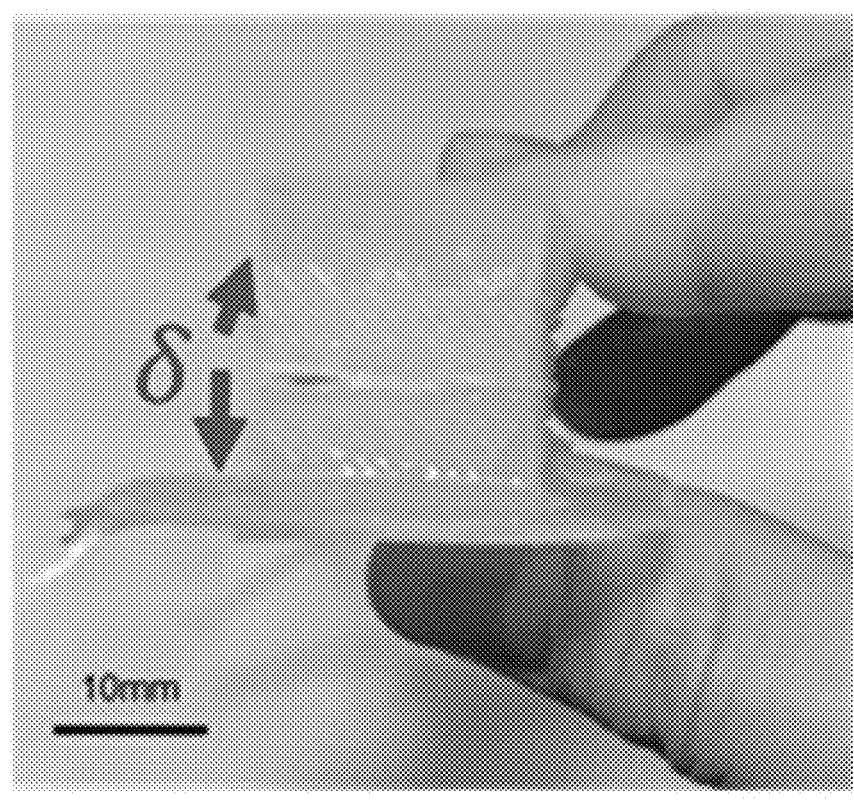
FIG. 6 shows a LuGre friction model annotated image of a constructed physical example of an optoelectronic soft tactile sensor according to one or more embodiments, for stick-slip control and other applications.

FIG. 6 shows a LuGre friction model annotated image of a constructed physical example of an optoelectronic soft tactile sensor according to one or more embodiments, for stick-slip control and other applications.

Figure 7:
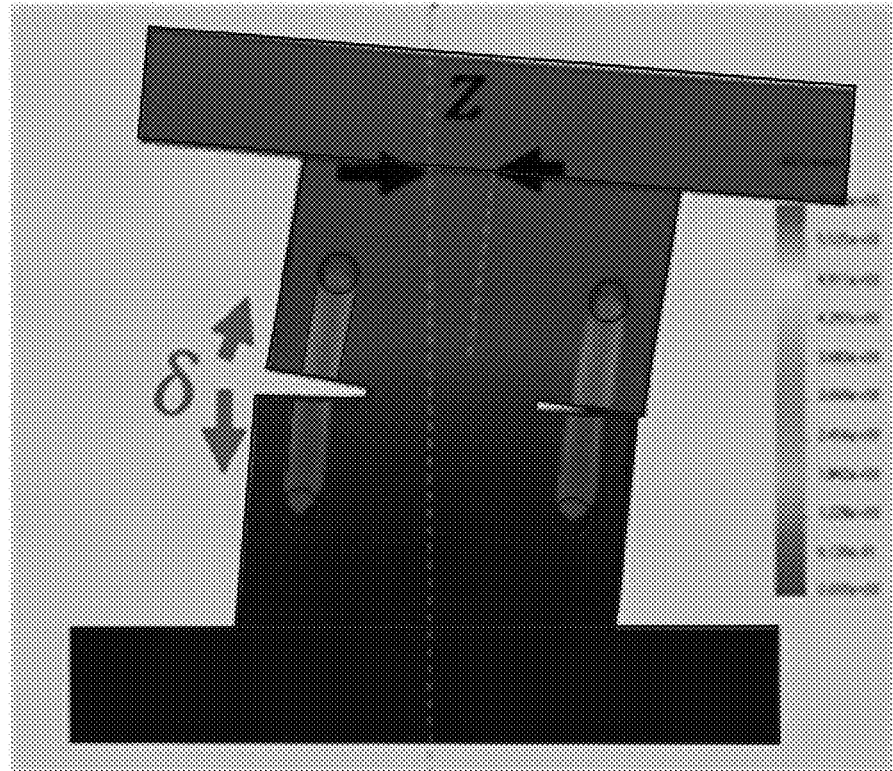
FIG. 7 shows an example Finite Element Analysis (FES) of the sensor, which can be a bristle friction type model representing mechanical properties such as viscoelastic, and spring constant, relating to lateral force applied while an object is sticking on the surface.

FIG. 7 shows one Finite Element Analysis (FES) model of the sensor, which can be a bristle friction type model representing mechanical properties such as viscoelastic, spring constant. This may be a LuGre friction model, which may represent gripper-surface-to-object-surface contact interface as flexible bristles that deform in response to lateral force being applied, while an object is sticking on the surface.

FIG. 8a shows a captured image of a no-indicated force state exhibited by a constructed example optoelectronic soft tactile sensor based force detection system according to one or more embodiments, and shows inserted with the captured image a LuGre simulation model representing the no-force applied state.

FIG. 8b shows a captured image of an active detection light state exhibited by the constructed example optoelectronic soft tactile sensor based force detection system according to one or more embodiments, responsive to manual pressing the optoelectronic soft tactile sensor.

FIG. 8c shows a captured image of a manual tilting of the deformable body of the detection system's optoelectronic soft tactile sensor.

FIG. 8d shows a captured image of an active state of a light emitting diode (LED) of the system, corresponding to a force on the optoelectronic soft tactile sensor according to one or more embodiments.

FIG. 9 shows a two-axis graph format record of FIG. 8a-8d optoelectronic soft tactile sensor based force detection system LED intensity versus optoelectronic soft tactile sensor deflection magnitude, from manual deflecting of the system's optoelectronic soft tactile sensor.

Figure 10A:
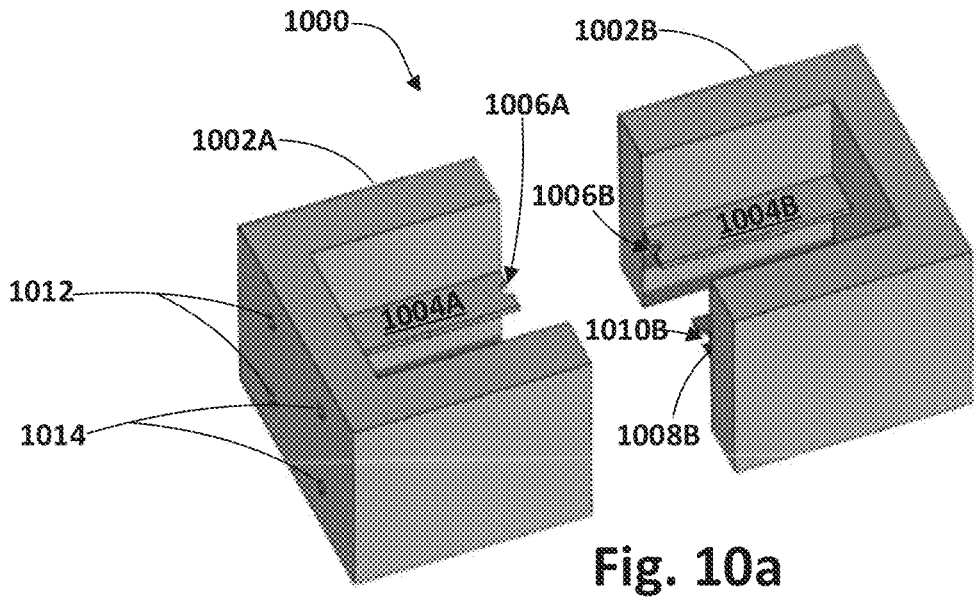
FIG. 10a shows a perspective view of one example two-part three-dimensional (3D) printed structure implementing an example mold for optoelectronic soft tactile sensors and intermediate structures of optoelectronic soft tactile sensors according to various embodiments.

FIG. 10a shows a perspective view of one example two-part arrangement for an example configuration of a three-dimensional (3D) printed implementation of a mold for processes in one or more methods of making optoelectronic soft tactile sensors and intermediate structures of optoelectronic soft tactile sensors according to various embodiments.

Figure 10B:
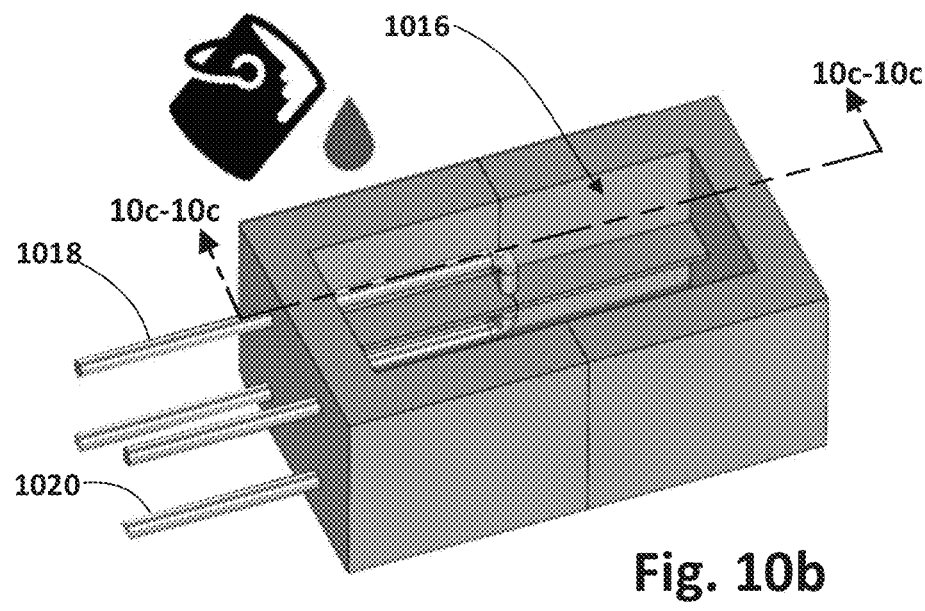
FIG. 10b shows a perspective view of an example assembled mold, using the FIG. 10a example two-part arrangement and showing an example placement of optical waveguide structure, for a subsequent fill-in securing according to one or more embodiments.

FIG. 10b shows a perspective view of an example assembled mold, using the FIG. 10a example two-part arrangement and including, arranged in the example cavity of the mold, one example placement of optical waveguide structure for surrounding with a liquid silicone filling that will be introduced in the mold cavity.

Figure 10C:
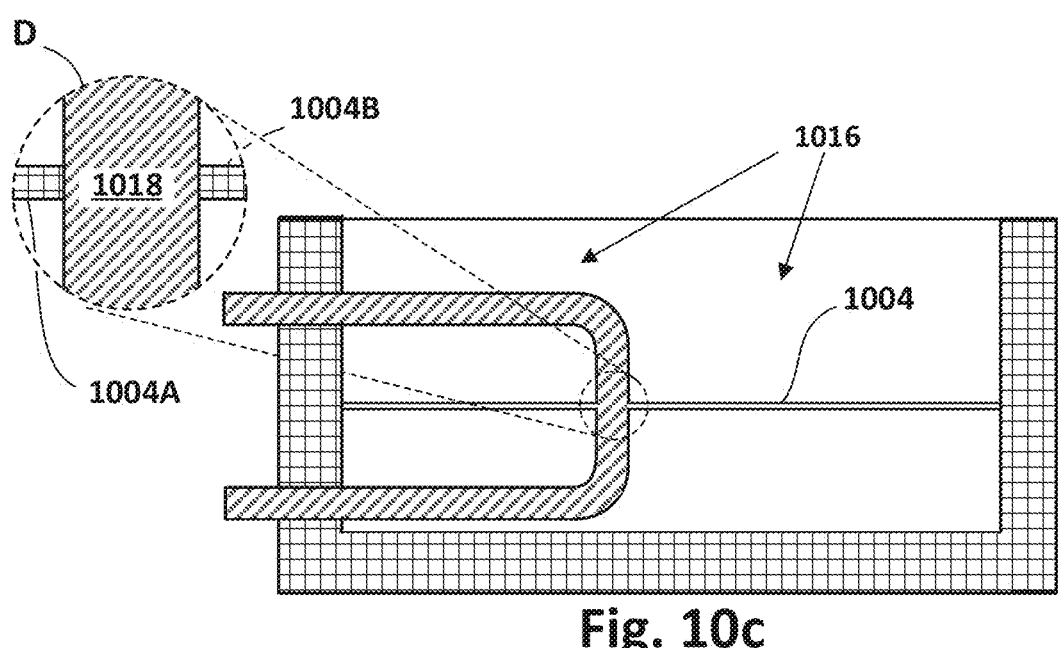
FIG. 10c shows a cross-section front projection view of the FIG. 10b assembled mold, seen from FIG. 10b cross-cut projection plane 10c-10c.

FIG. 10c shows a cross-section front projection view of the FIG. 10b assembled mold, seen from FIG. 10b cross-cut projection plane 10c-10c.

Figure 10D:
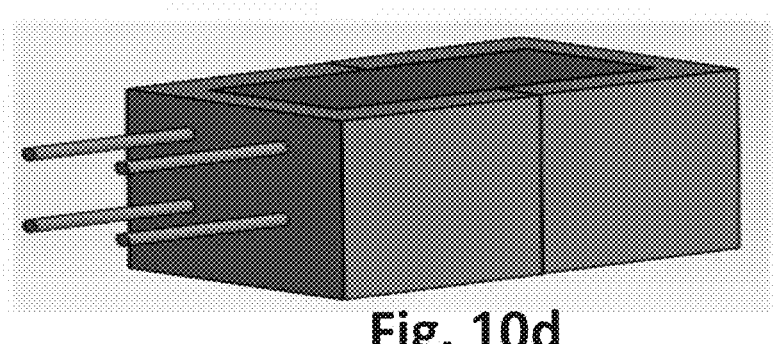
FIG. 10d shows a perspective view of the FIG. 10b assembled mold after being filled with deformable material, e.g., silicone or other elastomer, and the filling annealed.

FIG. 10d shows a perspective view of the FIG. 10b assembled mold after being filled with an uncured liquid state of the material for the deformable body, e.g., uncured silicone or other elastomer, and the filling annealed.

Figure 10E:
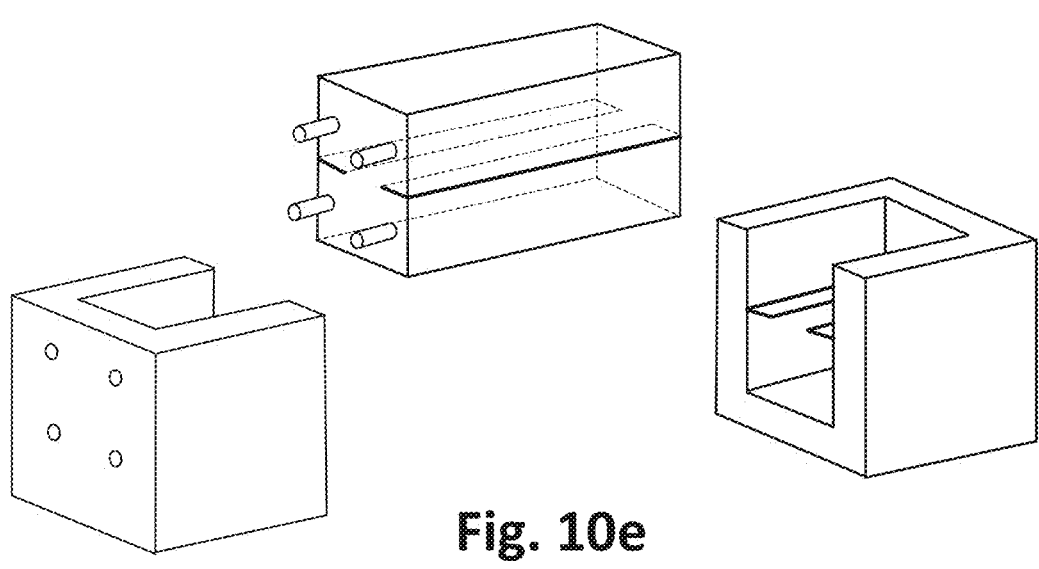
FIG. 10e shows a perspective view of an almost completed optoelectronic soft tactile sensor, after release from separated parts of the printed mold.

FIG. 10e shows a perspective view of an almost completed optoelectronic soft tactile sensor, after release from the now separated parts of the example 3D printed mold.

Figure 11:
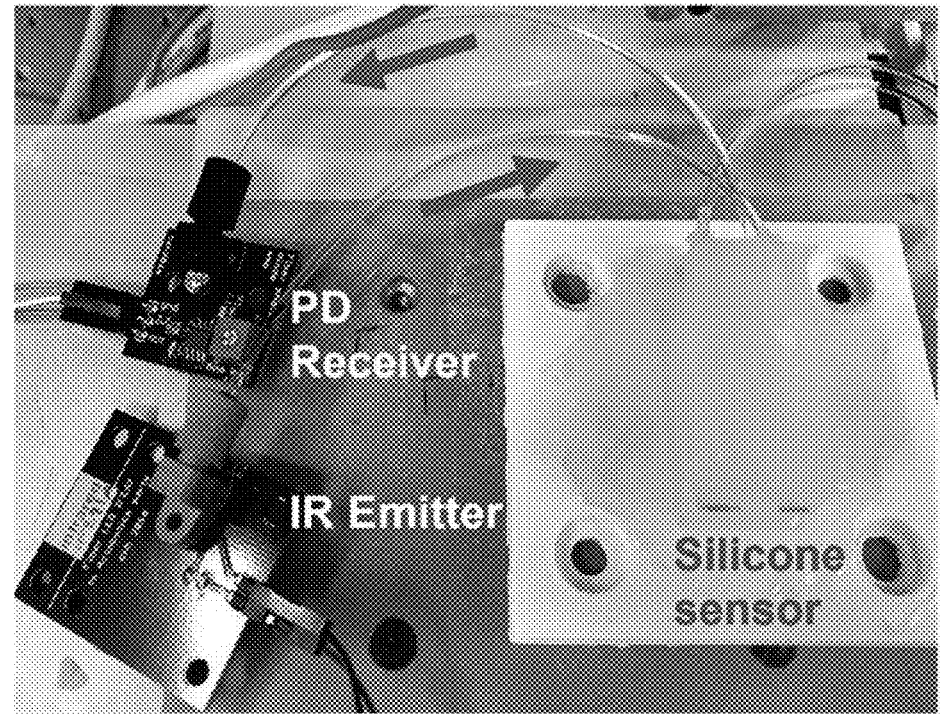
FIG. 11 shows a captured image of one constructed, operational prototype optoelectronic soft tactile sensor system according to one or more embodiments, with infrared an (IR) emitter and photodiode receiver.

FIG. 11 shows a captured image of one constructed, operational prototype optoelectronic soft tactile sensor based force detection system according to one or more embodiments.

Figure 12:
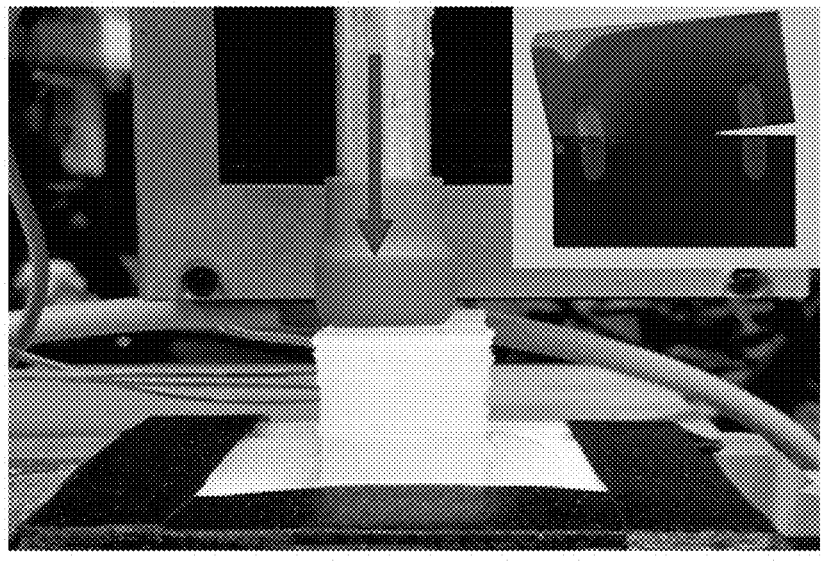
FIG. 12 shows a captured image of an operative arrangement for test of prototype optoelectronic soft tactile sensor-based force detection systems according to one or more embodiments.

FIG. 12 shows a captured image of an operative arrangement for test of prototype optoelectronic soft tactile sensor based force detection systems according to one or more embodiments.

Figure 13:
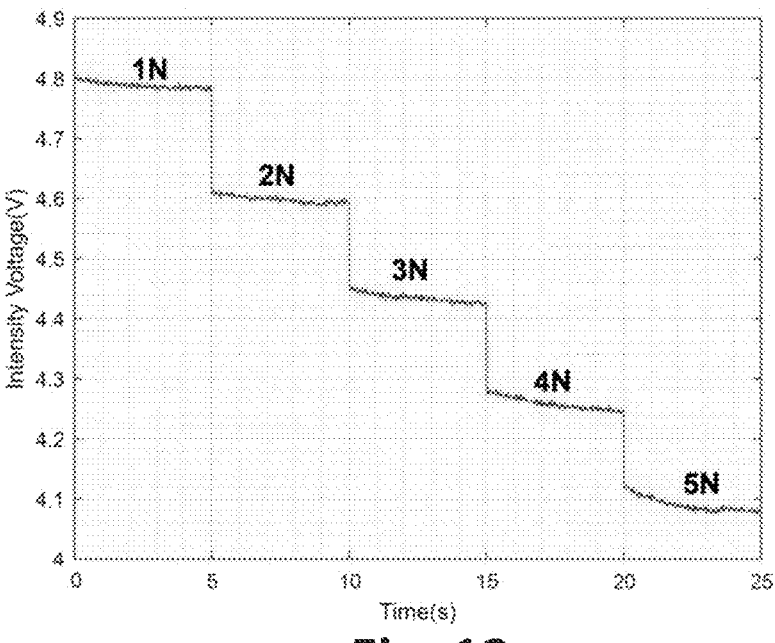
FIG. 13 shows static normal force verses light intensity data produced by LED light of the FIG. 12 system in response to changes in said static normal force, applied by the FIG. 12 operative arrangement.

FIG. 13 shows static normal force verses light intensity data produced by an LED light of the FIG. 8 system in response to changes in said static normal force, applied by the FIG. 9 operative arrangement to the FIG. 8 system's physical optoelectronic soft tactile sensor according to one or more embodiments.

Figure 14:
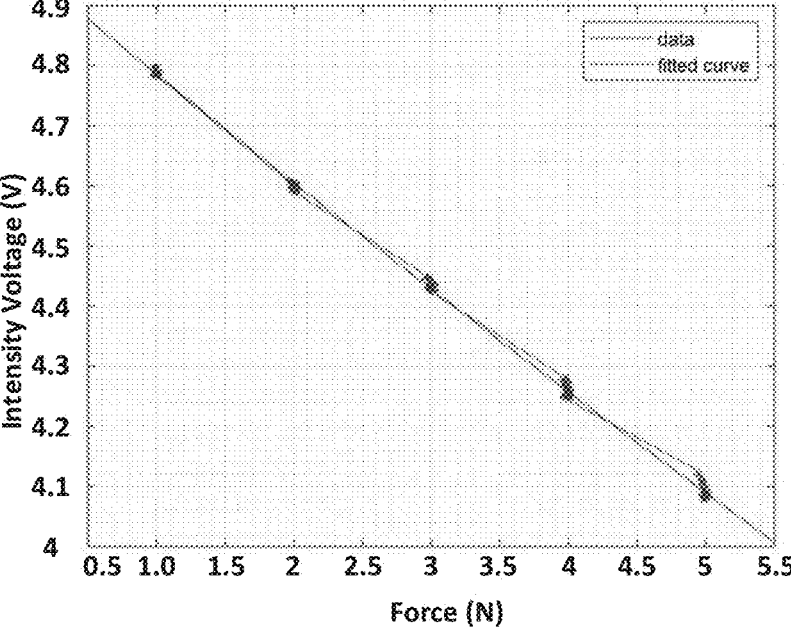
FIG. 14 is a force versus light intensity graph, showing a linear relation of the light intensity output by the FIG. 12 tested optoelectronic soft tactile sensor-based force detection system and the applied static normal force.

FIG. 14 is a force versus light intensity graph, showing a linear relation of the light intensity output by the tested optoelectronic soft tactile sensor based force detection system and the applied static normal force.

FIG. 15a and FIG. 15b shows sensor hysteresis test with a 0.5 Hz sine wave normal loading.

FIG. 16 shows a sensor hysteresis test with a 0.5 Hz sine wave normal loading. It presents relatively uniform intensity data for the loading and unloading process, with a linear intensity-vs-force relationship in the sub-5 N force range.

FIG. 15a, FIG. 15b, and FIG. 16 shows sensor bandwidth results from 1 Hz to 3 Hz sine wave.

Figures 17A, 17B, 17C, 18A, 18B:
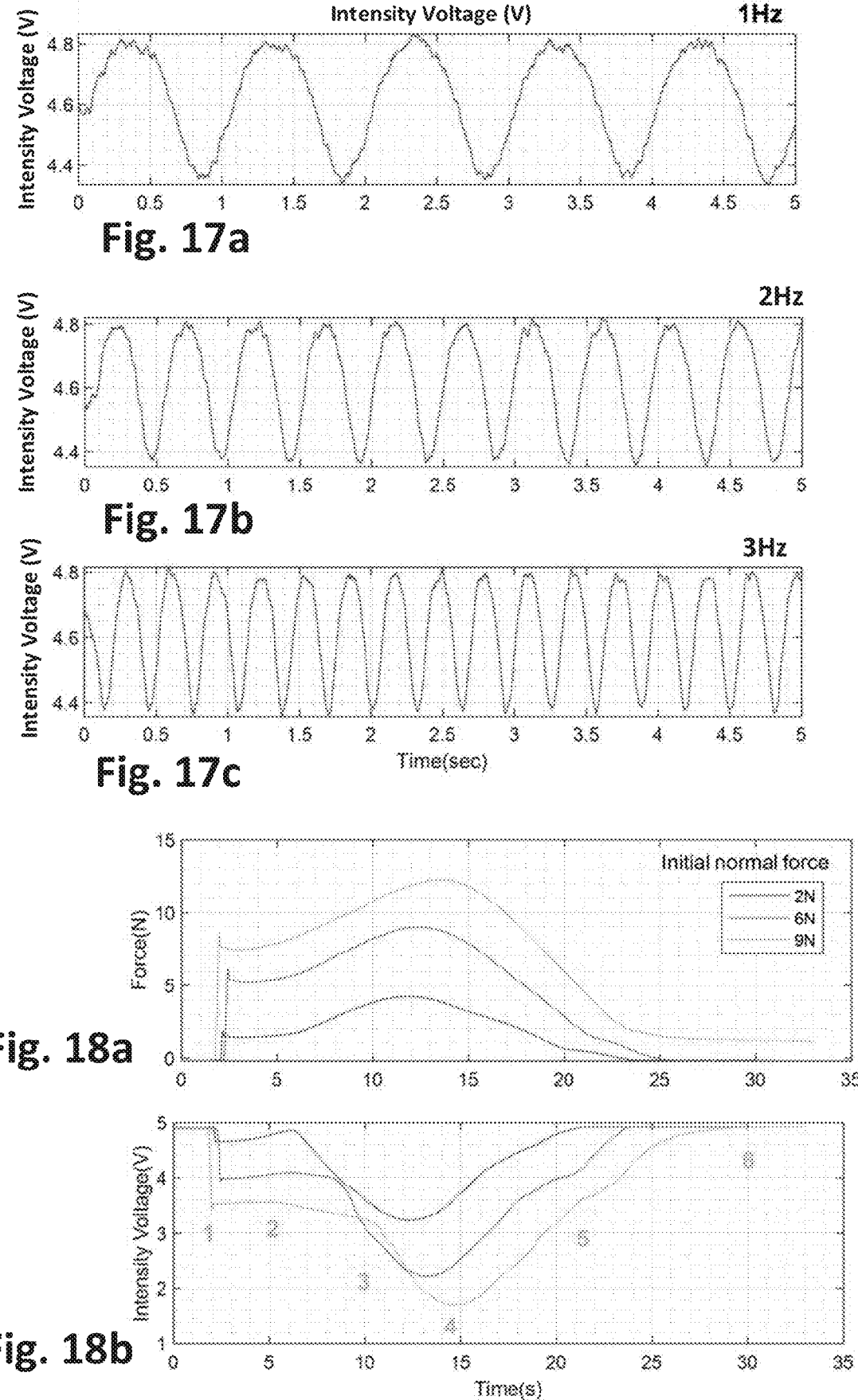
FIG. 17a, FIG. 17b, and FIG. 17c show FIG. 12 sensor bandwidth results from 1 Hz to 3 Hz sine wave.
FIGS. 18a-18b show a slip performance of the FIG. 12 system in terms of normal force and light intensity according to different initial normal forces.

FIGS. 17a-17c show slip performance in terms of normal force and light intensity according to different initial normal forces.

FIGS. 18a-18b and FIGS. 19a-19f show a silicone sensor deformation while slipping. Each number at the right corresponds to the numbers on the intensity voltage data at the left.

Figure 21:
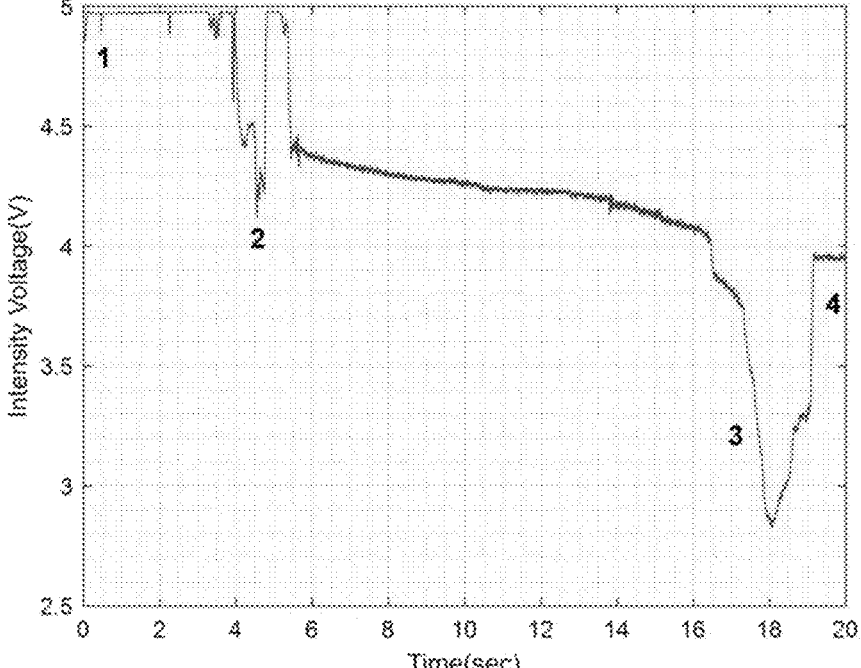
FIG. 21 shows plots of transmitted intensity voltage signal vs. time during stick-slip events.

The respective captured images on FIGS. 20a-20d show stick-slip events 1 through 4, respectively. FIG. 21 shows the light sensor voltage intensity data, indicative of lateral force transferred to the gripping surface. The initial weight was 300 g. As pebbles were poured into the FIG. 20a bottle 2002, the gripper experienced increasing lateral force until slip occurred. Referring to FIG. 21 it is seen that the intensity data was relatively constant over the region labeled as numeral "1," until the pebbles hit the bottom of the bottle, which made a transient impulse signal, shown on FIG. 21 as the region labeled numeral "2." Then the weight was incrementally increased by adding more pebbles to the bottle 2002. Referring to FIG. 21, the intensity data showed a gradual decrease while the bottle was gripped by the sensor without slipping. At a critical weight, a slip occurred and the bottle rapidly dropped, causing the voltage intensity labeled numeral "3." Then the signal was restored when the object, i.e., the bottle 2002, slipped until the bottom touched the floor, causing the voltage intensity labeled numeral "4."

In one or more embodiments innervated fibers are closed and opened by the external force, one should expect that the light intensity can be mapped to a range of gap distances and thereby lateral forces. Referring to FIG. 5a to FIG. 5d, one end of the fiber was connected to a red light-emitting diode (LED) while the other end was connected to a light intensity meter to measure how its brightness is changed by the external forces. Also, FIG. 6 provides the results from a ray optics simulation (COMSOL) and actual light intensity data through a photodiode receiver. Both simulation and experiment indicate that the light transmittance is diminished by increasing the distance between fiber faces.

One example design of the sensor is presented in FIG. 1 and FIG. 3. It uses clear thermoplastic polyurethane (TPU) 3D printer filament as an optical light guide inside of the finger-sized silicone material.

Also, the fabrication process is simple because mold parts can be easily 3d-printed and cured relatively fast in several minutes. Due to the simplicity of the design, it is easy to reproduce, modify and apply.

According to one or more embodiments the ends of the optical fiber are connected to an IR emitter and photodiode receiver in order to detect deformation-induced changes in transmitted light intensity. As the loading machine compresses the silicone vertically on the left side FIG. 9, the structure deforms and the light intensity through the fiber on the right side decreases linearly with applied normal forces across the 1 N to 5 N range FIG. 12a-12b. As applications for this optoelectronic sensor include control, practices may include calibrating and assessing its response speed. In some applications, TPU and silicone materials used in this design have viscoelastic properties that lead to hysteresis. FIG. 12a through FIG. 14c show a normal force sensor's response to periodic loading and unloading at frequencies up to 3 Hz. The hysteresis phenomenon between loading and unloading process is shown in FIG. 13 for 0.5 Hz. While there is hysteresis, the loading and unloading curves are reproducible and relatively linear.

Referring to FIGS. 18a and 18b, and FIGS. 19a through 19f, an analysis was performed to verify stick-slip detection. The loading machine used in this test was the FIG. 12 machine used same as the one used in the normal force test. as well as z-axis (vertical). Slip motion is made by pressing the silicone along the z-axis to an initial normal force, then starting slow x-axis motion. As the silicone sensor moves along the x-axis, the light intensity changes as does the normal force data. The light intensity data shows characteristic and reproducible features during a stick-slip event. Given the numbers on the intensity graph in FIGS. 18a and 18b, the data shows the stick-slip process intuitively because the silicone sensor moves as if it is a single bristle in the surface friction model. Each different color in the FIGS. 18a and 18b graph accounts for different initial normal forces. Even though the initial normal force is different, the stick-slip process in terms of the light intensity has analogous features in each trace. Thus, it is possible to classify the stick-slip process over each data trace from the soft sensor. As the sensor moves through the test procedure, as seen in FIGS. 18a and 18b, from step 1 (loading) to step 4 (maximum x-displacement without slip), the rod indenter is still stuck on to the sensor. After that, a slip occurs and the measured normal force decreases to 0, which is illustrated in the procedure from step 4 to step 6.

There was analysis of the sensor's response to a dynamic situation by installing it on a robotic gripper. In FIG. 21, as well as in FIG. 18b as described above, which are plots of transmitted intensity voltage signal vs. time during stick-slip events. Based on the plots we identified a "pre-slip" condition where an object is gripped by the silicone surface, but the intensity data slowly decreases before the object actually slips from the surface. Therefore, a scheme to maintain grasp control in slipping situations may comprise maintaining the sensor signal uniform once the signal begins its slow decrease. Based on the idea, a basic compensation test was implemented to verify grasping adjustment, shown in FIGS. 20a through 20d. The difference between previous and current feedback intensity data is used for error, with a goal of making the error go to zero. Since the gripper width adjustment command is the only input to the system when the signal starts to decrease (for example, between the middle and the rightmost images in FIG. 23), the control scheme prevents the object from slipping.

In the static force tests, a motorized loading machine as shown in FIG. 12, and in FIGS. 19a-19f provided normal forces in the same Compact Rio sampling rates as the ADC (60 Hz) when the indenter presses the silicone. The loading distances (z-axis) are determined by the initial target normal forces.

Figure 22:
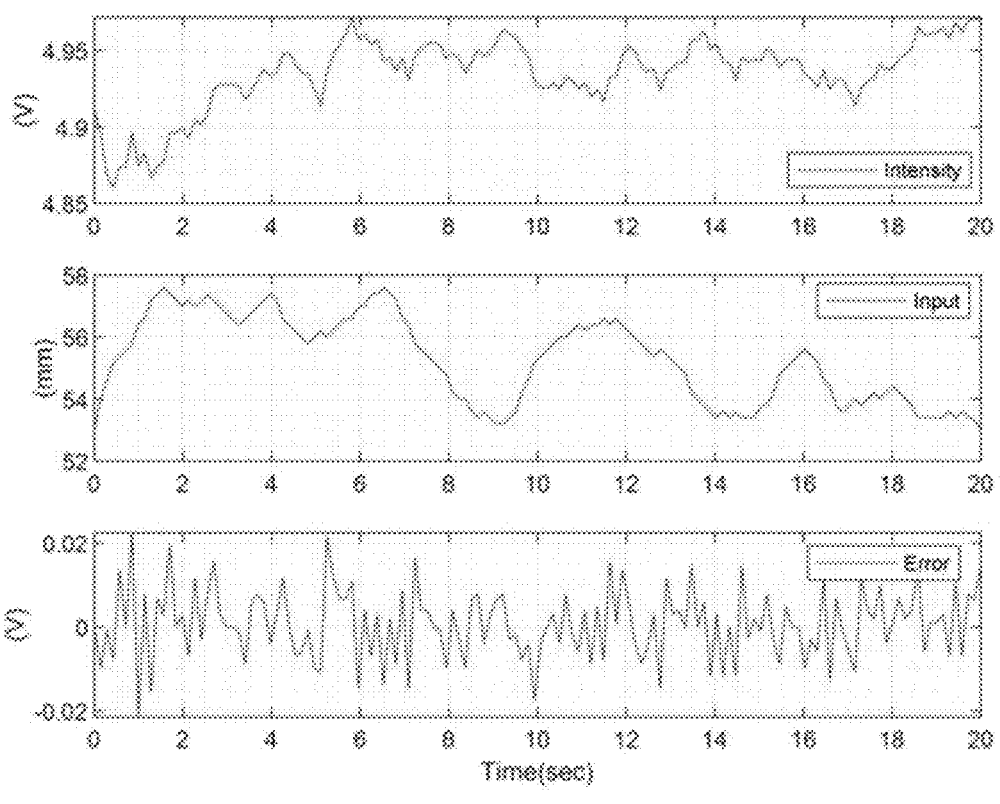
FIG. 22 shows current feedback intensity data obtained in a compensation test verifying grasping adjustment.
Figure 23:
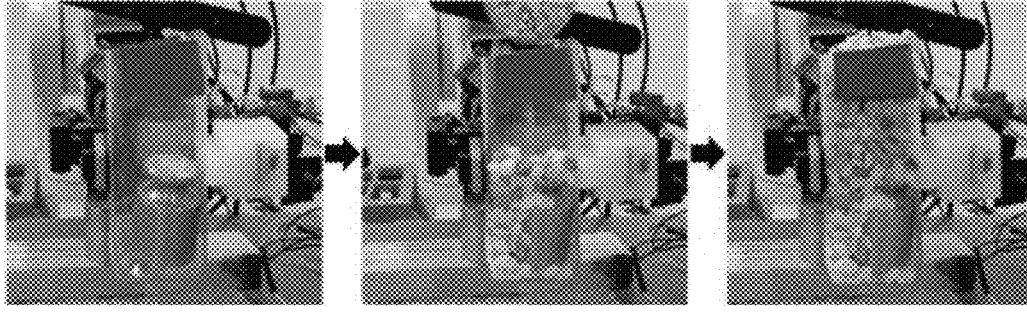
FIG. 23 shows a sequence of captured images of a slip event.

Referring to FIGS. 22 and 23, a compensation test was implemented to verify grasping adjustment. The difference between a previous and current feedback intensity data was used for error, with a goal of making the error go to zero. Since the gripper width adjustment command was the only input to the system when signal began decreasing for example, between the middle and the rightmost image of FIG. 23, the control scheme prevented the object from slipping.

Tests indicated the novel bristle-based design gives rise to information on normal forces and friction-driven lateral forces during a stick-slip event. The physical performance of the sensor is illustrated through the stat is state experiment, which shows the linear relationship between the sensor output and pressure force over the 0-5 N range, and the frequency test, which shows how the sensor during uniform slipping velocity tests, it was verified that the soft sensor can provide classified stick-slip data regardless of its initial normal force. Robotic gripper test data showed stick-slip detection without direct normal force measurement, and shows an error compensation method can be applied to control the gripper separation and prevent slip in a real-time manner. Therefore, because of its simple fabrication and mechanical characteristics, this novel skin-like soft silicone design is a good candidate to measure frictional information as well as normal force in gasping applications such as wearable tactile sensors for robotic grippers and human hands.

A prototype was constructed using 3D printed parts for installing optical fibers and molding the silicone deformable body. The design tool that was used was Solidworks, but this is not ay limitation or indication of preference. The silicone material can be obtained from, for example, SMOOTH-ON. Inc. (Dragon Skin 10 Very Fast). One example successful curing time that was used was 30 min curing time at room temperature. Young's modulus 22 psi. The optical fiber that was used is available from Matter-Hackers, Inc. (Clear MH Build Series TPU Flexible Filament); the diameter of the optical fiber that was used was 1.75 mm. Because the fiber is stiffer than the silicone and may resist making a tight curvature radius, e.g., the example 3 mm, the fiber may be annealed before cutting. The annealing can provide an acceptable reliability of the fiber remaining on the intended path after cutting. The annealing can be performed, for example, in an oven and an example temperature and time. After cutting and annealing the finger-sized soft sensor (size 40 mm×10 mm×20 mm) is nearly complete. Regarding the height of the molded clearance gap, an example can be, without limitation, approximately 0.5 mm-0.7 mm. Factors to be considered regarding the height of the molded clearance gap include the resolution of the 3D printer device, and the design specification of the no-force, i.e., resting state, height. Completion of the fabrication process can be the cutting of the TPU fiber using a razor (0.2 mm blade width) inside the molded clearance gap.

When the silicone sensor deformed, the light source transmitted from a 95-nm infrared emitter, which was model EF-E91A, Industrial Fiberoptics Inc., USA) to an optical receiver, and amplified photodiode circuit. Then the light intensity analog voltage signal goes to an analog-to-digital converter, which is a NI Compact Rio during static experiments (60 Hz sampling rate) and Adafruit Metro board for the robotic gripper test (about 300 Hz sampling rate; 10 Hz for the compensation version).

Figure 24:
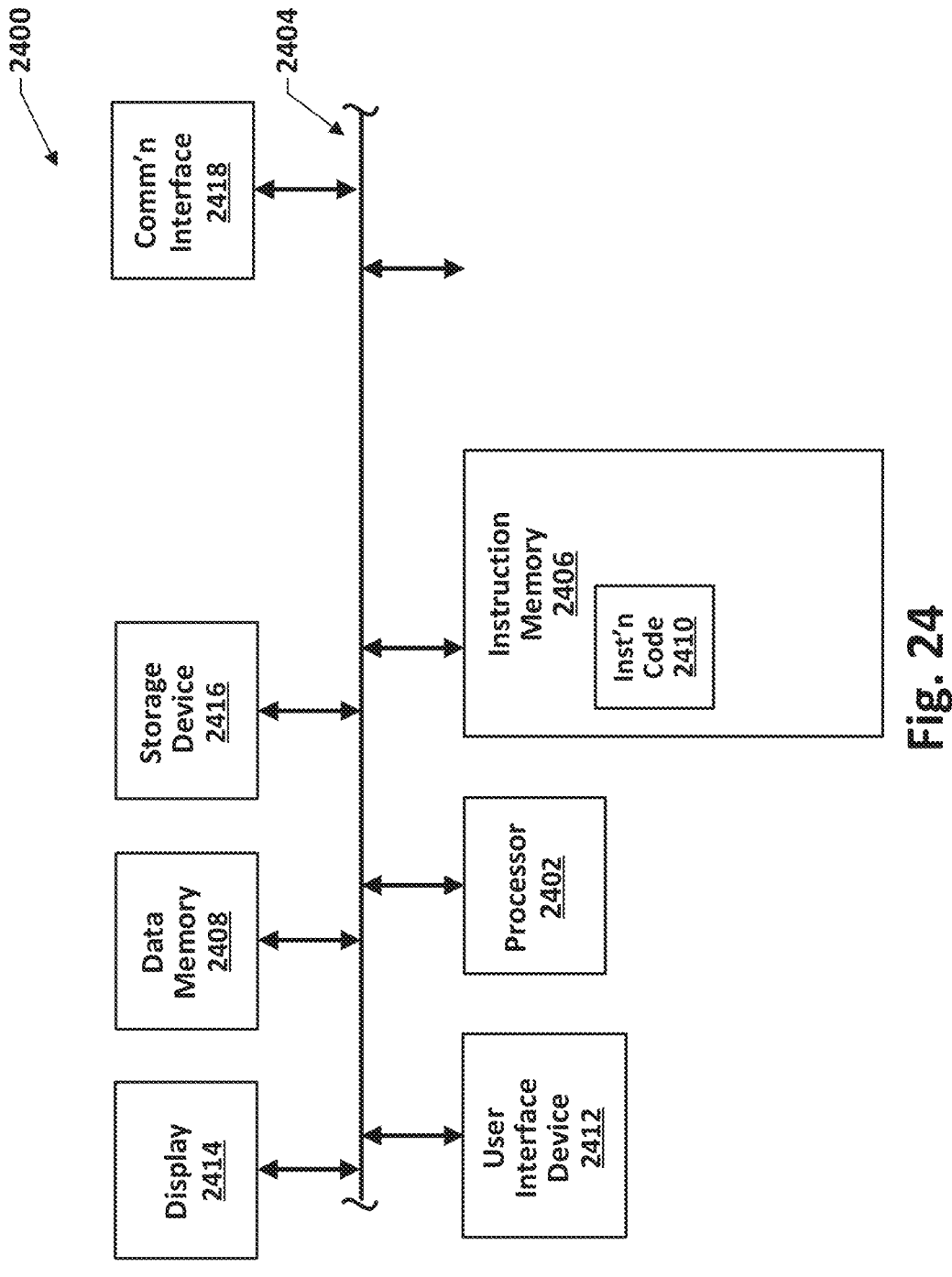
FIG. 24 shows a logic schematic of an example computing system on which various systems and methods in accordance with one more disclosed embodiments can be practiced.

FIG. 24 shows a logic schematic of an example computing system 2400 on which various systems and methods in accordance with one more disclosed embodiments can be practiced. The computer system 2400 can include a hardware processor 2402 communicatively coupled, e.g., by a bus 2404, to an instruction memory 2406 and to a data memory 2408. The instruction memory 2406 can be configured to store, on at least a non-transitory computer readable medium as described in further detail below, executable program code 2410. The hardware processor 2402 may include multiple hardware processors and/or multiple processor cores. The hardware processor 2402 may include hardware processors from different devices that can cooperatively perform computation d and processing operations. The computer system 2400 system may execute one or more basic instructions included in the executable program code 2410. The computer system 2400 may include a user input 2412, e.g., a keyboard, touchpad, or voice-interaction resource, and may include a display 2414. The computer system 2400 may include a large capacity local storage, shown a "storage device 2416, and may include a network interface 2418. The network interface 2418 can, for example, include a TCP/IP capability, and capability of intaking an Internet Service Provider (ISP).

Figures 25, 26, 27:
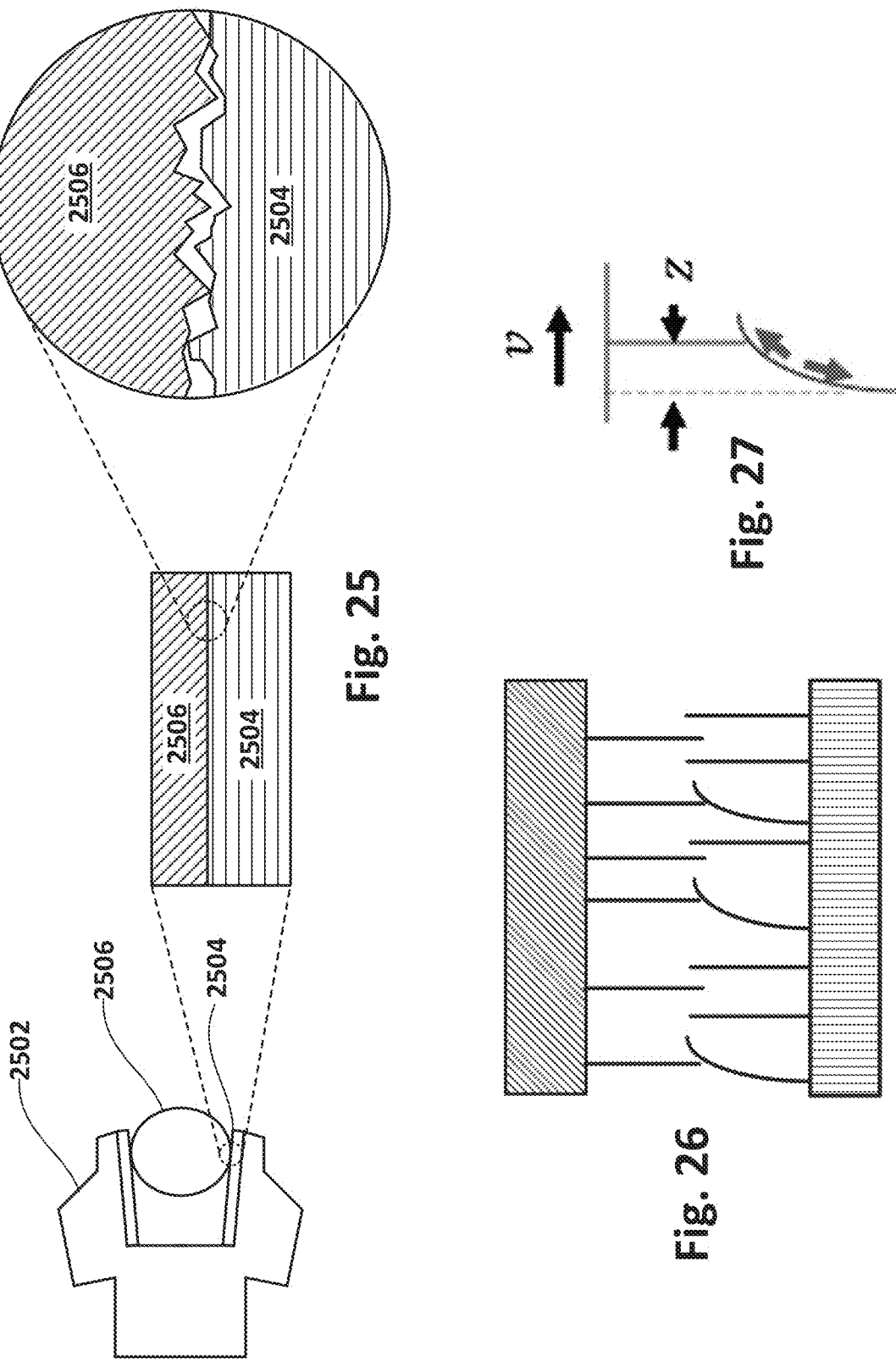
FIG. 25 shows diagrammatically a Bristle model design derived from tribology.
FIG. 26 shows diagrammatically a Bristle model example of a contact surface, based on the LuGre friction model.
FIG. 27 shows diagrammatically that deformation of the silicon ridge by a lateral force causes an amount of lateral deformation z.

FIG. 25 shows diagrammatically a Bristle model design derived from tribology. The figure shows a robot gripper 2502 having a gripper contact material 2504, holding an object 2506, and show an intermediate expanded projection view of the contact material 2504 contacting the object 2506, then a further expanded view of the interface between the contact material 2504 and the object 2506.

FIG. 26 shows diagrammatically a Bristle model example of the contact surface, which can be based on the LuGre friction model. The FIG. 26 Bristle model represents the contact interface as flexible bristles that deform while lateral force is applied and an object is sticking on the surface.

FIG. 27 shows diagrammatically that deformation of the silicon ridge by a lateral force causes an amount of lateral deformation z.

According to one or more embodiments, processes can include robotic gripper lifting with real-time optoelectronic soft tactile sensor based adaptive control. Operations can include controlling a robotic gripper that includes an opto-electronic tactile sensor for stick-slip detection on a gripping surface, to grip an object and to lift the object. Operations may also include, concurrent with controlling the robotic gripper, receiving at a computer resource a deflection data from the opto-electronic soft tactile sensor and computing, based on the deflection data, whether an incipient slip condition is present. Operations can include, in response to a positive result of the computing, controlling the gripper to take a corrective action.

Figure 28:
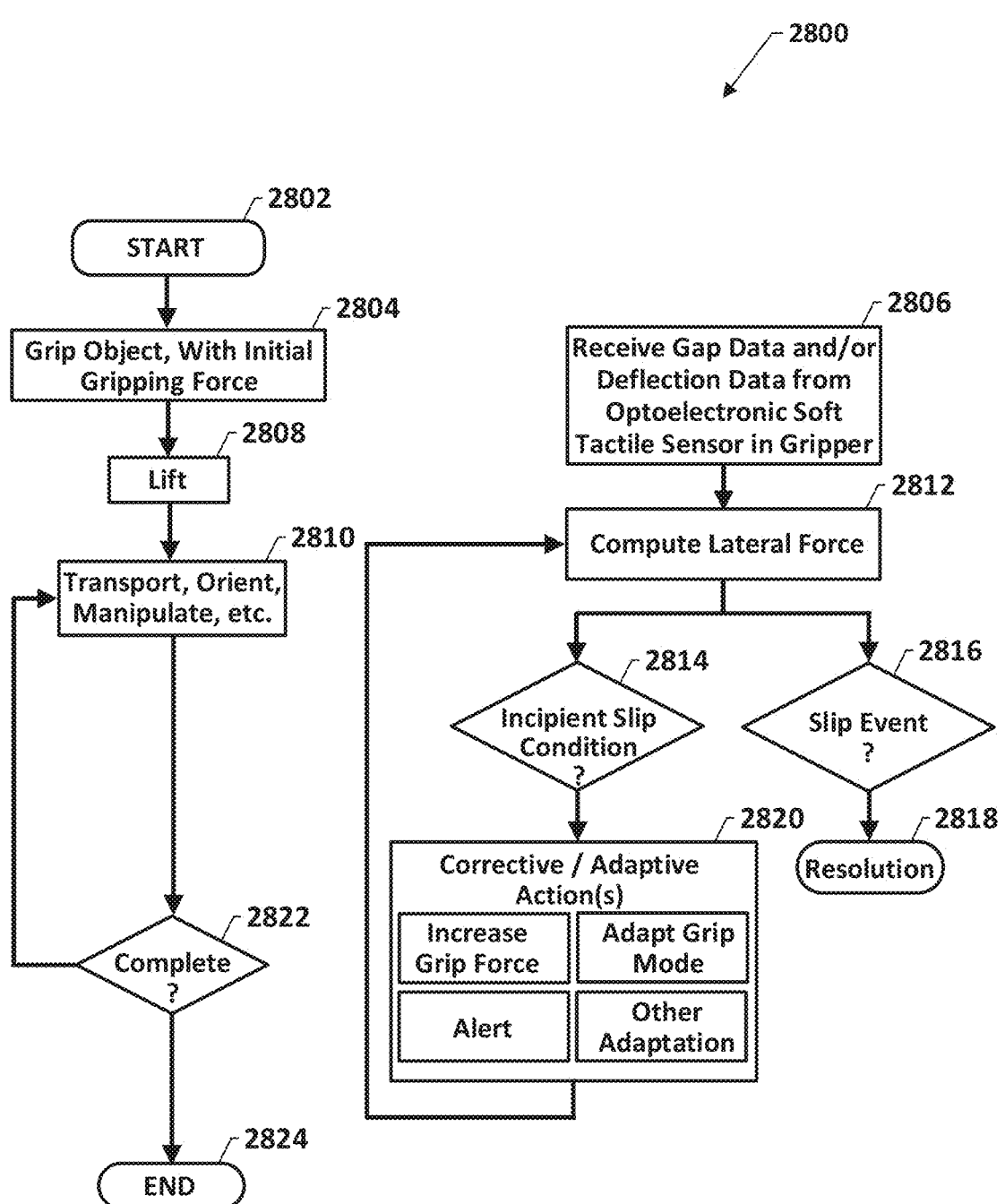
FIG. 28 shows a graphic flow chart representing operation in an example process of robotic gripper lifting with real-time optoelectronic soft tactile sensor based adaptive control.

FIG. 28 shows a graphic flow chart representing a flow 2800 of operations in one example of such a process. An instance of the flow can include a start 2802, from which operation can proceed to grip 2804 an object. The grip 2804 may apply an initial gripping force. The initial gripping force may be programmed, or may be developed in artificial intelligence training, or a most recent stored adaptation of the force, resulting from an adjustment in a previous instance of the flow 2800. Concurrent with gripping the object, operations can include receiving at 2806 gap data, which can be referred to as a deflection data as described above from an optoelectronic soft tactile sensor according to one or more embodiments. Operations can include lifting 2808 and transporting, orientating, and/or manipulating 2810.

While the object is being transported 2810, operations can include computing 2812 the lateral forces on the objects, as described earlier in this disclosure. Based on the computation, operations may include a detecting 2814 of an incipient slip condition. Instances may also occur wherein the computations may indicate a slip event 2816. Actions responsive to detecting a slip event may be generally referenced as a "resolution," which may include, for example, human intervention.

In response to detecting 2814 an incipient slip condition, corrective and/or adaptive actions 2820 according to one or more embodiments may be applied. Some, such as adjusting the gripping force, may be automatic. Others may include, for adapting the mode of gripping the object, e.g., gripping the object at another surface. Operations can include determining 2822 whether the robotic transport is completed. If the answer is "yes, operations may proceed to end at 2824.

A computer program product, for purposes of this description, is an article of manufacture that has a computer-readable medium with executable program code that is adapted to enable a processing system to perform various operations and actions. A computer-readable medium may be transitory or non-transitory. Non-transitory computer-readable media may be understood as a storage for the executable program code. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. Examples of on-transitory computer-readable media: include removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one, or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

We claim:

1. An opto-electronic sensor for stick-slip detection, comprising:

a deformable body, comprising a gripping surface, configured as securable to and movable by a gripper to a position wherein the gripper surface contacts an object; and one or more optical waveguides positioned within the deformable body, wherein the one or more optical waveguides each includes a gap, wherein the deformable body is further configured to exhibit a lateral deflection responsive to receiving via the gripping surface a lateral force from the object, and the deformable body and the one or more optical waveguides are mutually configured to produce a corresponding change in the gap of the one or more optical waveguides responsive to the lateral deflection.

2. An opto-electronic sensor according to claim 1, wherein the one or more optical waveguides comprises:

a first segment that extends to a first optical face within the deformable body, and a second segment that extends to a second optical face within the deformable body and is spaced, in a gap direction, from the first optical face by the gap.

3. An opto-electronic sensor according to claim 1, wherein the deformable body comprises an elastomer.

4. An opto-electronic sensor according to claim 3, wherein the elastomer comprises silicone.

5. An opto-electronic sensor according to claim 1, wherein the one or more optical waveguides comprise a first internal optical waveguide and a second internal optical waveguide.

6. An opto-electronic sensor according to claim 5, wherein the deformable body, the first internal optical waveguide, and the second internal optical waveguide are mutually further configured to produce, responsive to a first direction of the lateral deflection, a positive change in a first gap of the first internal optical waveguide and a negative change in a second gap of the second internal optical waveguide.

7. An optoelectronic sensor according to claim 6, wherein:

the first gap comprises a first pair of optical faces within the deformable body and the second gap comprises a second pair of optical faces within the deformable body, the first pair of optical faces comprises a first soft optical fiber end surface aligned at a height in a first reference plane, and a second soft optical fiber end surface laterally aligned with and facing toward the first soft optical end surface, and the second pair of optical faces comprises a third soft optical fiber end surface aligned at said height in said first reference plane, laterally spaced from the first soft optical fiber end surface, and fourth soft optical fiber end surface laterally aligned with the third soft optical fiber end surface and facing toward the third soft optical end surface.

8. A method for gripper control, comprising:

controlling a robotic gripper that includes an opto-electronic tactile sensor for stick-slip detection on a gripping surface, to grip an object and to lift the object;

concurrent with controlling the robotic gripper, receiving at a computer resource a deflection data from the opto-electronic soft tactile sensor and computing, based on the deflection data, whether an incipient slip condition is present; and in response to a positive result of the computing, controlling the gripper to take a corrective action, wherein the opto-electronic tactile sensor for stick-slip detection comprises:

a deformable body, comprising a gripping surface, configured as securable to and movable by a gripper to a position wherein the gripper surface contacts an object; and one or more optical waveguides positioned within the deformable body, wherein the one or more optical waveguides each includes a gap, wherein the deformable body is further configured to exhibit a lateral deflection responsive to receiving via the gripping surface a lateral force from the object, and the deformable body and the one or more optical waveguides are mutually configured to produce a corresponding change in the gap of the one or more optical waveguides responsive to the lateral deflection.

9. The method according to claim 8, further comprising, based at least on the positive result of the computing, controlling another robotic device to take a supplemental or substitute corrective action.

10. The method according to claim 8, wherein the one or more optical waveguides comprises:

a first segment that extends to a first optical face within the deformable body, and a second segment that extends to a second optical face within the deformable body and is spaced, in a gap direction, from the first optical face by the gap.

11. The method according to claim 8, wherein the deformable body comprises an elastomer.

12. The method according to claim 11, wherein the elastomer comprises silicone.

13. The method according to claim 8, wherein the one or more optical waveguides comprise a first internal optical waveguide and a second internal optical waveguide.

14. The method according to claim 13, wherein the deformable body, the first internal optical waveguide, and the second internal optical waveguide are mutually further configured to produce, responsive to a first direction of the lateral deflection, a positive change in a first gap of the first internal optical waveguide and a negative change in a second gap of the second internal optical waveguide.

15. An activatable opto-electronic sensor comprising:

a deformable body; and a first optical waveguide, supported by the deformable body, comprising, within the deformable body, a segment of a first optical fiber; and a second optical waveguide, supported by the deformable body, comprising, within the deformable body, a segment of a second optical fiber, wherein, the deformable body is configured with a clearance gap that is configured to provide a clearance for an activating operation, the clearance gap being configured to provide for an insertion of a cutting blade to a depth sufficient to cut the segment of the first optical fiber by a cut width that establishes a first gap, and provide for an another insertion of the cutting blade to a depth sufficient to cut the segment of the second optical fiber by a cut width that establishes a second gap.

\* \* \* \* \*